United States Patent
Pfaff

(10) Patent No.: US 11,217,436 B2
(45) Date of Patent: Jan. 4, 2022

(54) SYSTEMS AND METHODS FOR DETERMINING MASS OF AN ION SPECIES

(71) Applicant: Thermo Fisher Scientific (Bremen) GmbH, Bremen (DE)

(72) Inventor: Hans Pfaff, Ganderkesse (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 82 days.

(21) Appl. No.: 16/692,884

(22) Filed: Nov. 22, 2019

(65) Prior Publication Data

US 2020/0176238 A1 Jun. 4, 2020

(30) Foreign Application Priority Data

Nov. 30, 2018 (EP) .................................. 18209531

(51) Int. Cl.
*H01J 49/00* (2006.01)
*G01N 30/72* (2006.01)
*G01N 30/86* (2006.01)

(52) U.S. Cl.
CPC .......... *H01J 49/0036* (2013.01); *G01N 30/72* (2013.01); *G01N 30/8631* (2013.01); *G01N 30/8675* (2013.01); *H01J 49/0004* (2013.01)

(58) Field of Classification Search
CPC .. H01J 49/0036; H01J 49/0004; G01N 30/72; G01N 30/8631; G01N 30/8675; G01N 30/88; G01N 27/62
USPC .................. 250/281, 282; 702/22–24, 27, 28
See application file for complete search history.

(56) References Cited

U.S. PATENT DOCUMENTS

| 2008/0067346 | A1 | 3/2008 | Amster I, et al. |
| 2010/0100336 | A1* | 4/2010 | Wright ................... G16C 20/20 702/32 |
| 2011/0054804 | A1 | 3/2011 | Pfaff |
| 2013/0206979 | A1 | 8/2013 | Bonner et al. |
| 2016/0379812 | A1* | 12/2016 | Moulds ................. H01J 49/025 702/23 |

(Continued)

FOREIGN PATENT DOCUMENTS

| EP | 3073510 A1 | 9/2016 |
| JP | 2010054406 A | 3/2010 |

(Continued)

OTHER PUBLICATIONS

Anonymous: "Mass spectrometry—Wikipedia", Oct. 29, 2018 (Oct. 29, 2018), XP055589215, Retrieved from the Internet: URL:https://en.wikipedia.org/w/index.php?title=Massspectrometry&oldid=871204626 [retrieved on May 16, 2019].

(Continued)

*Primary Examiner* — Michael Maskell

(57) ABSTRACT

There is provided a method of measuring a mass of an ion species in a mass stream. Where the mass stream is a mass stream emitted from a separation device as a function of a separation parameter, the method comprising:
obtaining a mass trace for the ion species, wherein the mass trace comprises a set of intensity peaks, each intensity peak providing a respective measured mass and a respective signal measured by a mass spectrometer; and
determining the mass of the ion species as an extrapolation of the measured masses of the set of intensity peaks of the mass trace towards a signal zero.

15 Claims, 17 Drawing Sheets

(56) References Cited

U.S. PATENT DOCUMENTS

2017/0098531 A1     4/2017   Green et al.
2019/0049445 A1*   2/2019   Arsac ............... G01N 33/56911

FOREIGN PATENT DOCUMENTS

| | | |
|---|---|---|
| JP | 2018059949 A | 4/2018 |
| WO | WO-03006951 A2 | 1/2003 |
| WO | WO-2008146323 A2 | 12/2008 |
| WO | WO-2012125121 A1 | 9/2012 |
| WO | WO-2016185108 A1 * 11/2016 | ............... C12Q 1/04 |

OTHER PUBLICATIONS

EP Extended Search Report dated May 24, 2019, to EP Patent Application No. 18209531.5.
Search Report dated Oct. 23, 2020, to JP Patent Application No. 2019-216202.
Notice of Reason for Refusal dated Nov. 2, 2020, to JP Patent Application No. 2019-216202.

* cited by examiner

350

360 Receive mass spectrometry data

370 Extract a mass trace

380 Provide extracted mass trace

Figure 3b

SYSTEMS AND METHODS FOR DETERMINING MASS OF AN ION SPECIES

CROSS-REFERENCE TO RELATED APPLICATIONS

This application claims the priority to EP Patent Application No. 18209531.5, filed on Nov. 30, 2018, which application is hereby incorporated herein by references in its entirety.

FIELD OF THE INVENTION

The present invention relates to systems and methods for measurement of the mass of ions species in a mass stream of a separation device, in particular, by the determination of the masses of ion species from mass traces measured by a mass spectrometer.

BACKGROUND OF THE INVENTION

The use of mass spectrometry (MS) techniques has become invaluable across many fields where detailed analysis of various chemical, and often biological, samples is required. Such mass spectrometry analysis is used to identify the chemical composition of given samples.

Straightforward analysis in a mass spectrometer typically involves the generation of ions from a chemical sample. The mass-to-charge ratio (m/z) and abundance of these ions are then measured by the mass spectrometer to produce a mass spectrum. The peaks (or centroids) in intensity at particular m/z values in such a mass spectrum provides a signature that indicates the relative abundance and mass of respective ions. This signature allows the compound (or compounds) that are comprised in the original chemical sample to be identified.

For samples that comprise a large number of different compounds, such as biological samples, MS techniques are often combined with separation techniques. Separation techniques typically involve partitioning (or separation) of a sample, for example by washing a sample that is bound to a stationary phase with a solvent, such that various components of the sample are emitted from the sample as a function of a given separation parameter (or parameters) such as retention time. Common separation techniques include chromatography techniques—such as liquid chromatography (LC) or gas chromatography (GC). With combined chromatography and mass spectrometry techniques (such as LC/MS), the chromatographic technique causes different compounds (or analytes) to elute from the sample at different times (known as retention time) or, more typically, over a period of retention time. The compounds eluted at a given retention time are analysed using a mass spectrometer to produce a mass spectrum for that retention time. Thus, a typical chromatography/mass spectrometry analysis produces many individual mass spectra over a given period of retention time. These mass spectra vary as a function of retention time, indicating the variation of compounds eluted from the sample over the same time.

Analysis of these mass spectra as a function of the elution parameter allows not only individual eluted compounds to be identified, but also the sample as a whole to be identified or characterized. The elution parameter is typically retention time in the examples discussed above but may also be ion mobility, pH, ion size and/or other physio-chemical properties. Often such physio-chemical properties are proportional to the retention time. Typically, this analysis is done by generating mass traces (such as extracted ion chromatograms XIC) for m/z values of interest. The m/z values of interest are themselves often determined based on the mass spectra. For example the m/z value of any intensity peak (in a spectrum) whose intensity falls above a certain threshold may be considered an m/z value of interest. A given mass trace is formed of the intensities of peaks in the mass spectra at (or around) a given m/z value. These intensities are then plotted as a function of elution parameter. A mass trace having a maximum (and optionally fulfilling certain other criteria such as a minimum abundance and or conformance to an expected signal model) is considered an event (or feature) and such a feature can be used in identifying a particular eluted compound.

Such a mass trace is usually reported with a single m/z value, measured or estimated, for the component ion species of the eluted compound. A number of mass traces, corresponding to different component ion species of the eluted compound, may be produced for a single elution event. The maximum intensities of these mass traces, along with the corresponding reported m/z values can be critical to identifying the eluted compound. As such, obtaining an accurate reported m/z value for a given mass trace is desirable. Typically, reported m/z values are calculated as a mean (or weighted mean) of the m/z values of the intensity peaks that make up the mass trace. The m/z values of more intense peaks may be weighted more highly, as it is assumed that they are subject to a smaller measurement error. In particular, for small intensities (which relate to small ion concentrations in the mass analyser) the measured m/z values typically have a large measurement error. This is due to the effect of the ion statistics of the small number of ions. For higher intensities (which relate to higher ion concentrations) the measurement error due to the effect of the ion statistics is greatly reduced. The m/z values of the intensity peaks that make up the mass trace are assumed in the field to be accurate to within 1 or 2 ppm. As such, a similar level of accuracy is ascribed to the reported m/z value.

It has been noted that during the elution of a first compound with an intensity peak (which may be represented as a centroid) at a given m/z value, if a second compound with another preferable intensity peak at a very similar m/z value also elutes, the measured m/z values of one or both peaks may be distorted at high ion concentrations (or high intensities). Efforts to reduce this distortion—called coalescence in the field have focussed on methods for avoiding situations where there are adjacent intensity peaks with small mass differences, to thereby hope to avoid any such deflection of the m/z values. This is not always practical.

Discussions of coalescence can be found in:

Gorshkov, M. V., Fornelli, L. and Tsybin, Y. O. (2012), "Observation of ion coalescence in Orbitrap Fourier transform mass spectrometry". Rapid Commun. Mass Spectrom., 26: 1711-1717. doi:10.1002/rcm.6289;

A. J. Peurrung and R. T. Kouzes (1995), "Analysis of space-charge effects in cyclotron resonance mass spectrometry as coupled gyrator phenomena" International Journal of Mass Spectrometry and Ion Processes 145: 139-153; and Tarasova, I. A., Surin, A. K., Fornelli, L., Pridatchenko, M. L., Suvorina, M. Y., & Gorshkov, M. V. (2015). "Ion Coalescence in Fourier Transform Mass Spectrometry: Should We Worry about This in Shotgun Proteomics?" European Journal of Mass Spectrometry, 21(3), 459-470. https://doi.org/10.1255/ejms.1356

SUMMARY OF THE INVENTION

It is an object of the invention to provide improved methods and systems determining the mass of ion species from mass traces measured by separation mass spectrometry analysis. In particular, in situations where significant mass deflections due to coalescence may be present in the mass trace.

Such deflection can lead to errors in the m/z values of the mass traces generated by methods of the prior art, as outlined above. In particular, the deflection may be such that some m/z intensity peaks in mass traces may be deflected by as much as 30 ppm or more. This can lead to reported m/z values for mass traces being in error by similar margins. This is described in more detail below with reference to FIG. 1d. Furthermore, it has now been observed that the deflection of m/z values is typically increases as a function of the number of ions (or ion concentration) in a mass analyser. The ion concentration may be represented by a signal, typically the signal to noise ratio (S/N value), of the ions when a mass trace is detected. Additionally, or alternatively the ion concentration may be represented by the intensity of the m/z intensity peak when ion concentration and intensity are correlated. In some mass analysers only a small number of the available ions are injected, though a large number of ions are provided by the separation device and/or ion source. At high ion intensities the ion concentration in the mass analyser is no longer correlated with the ion intensity of the provided ions.

In the present invention new methods and systems for determining (or measuring) masses of ions species are proposed. The invention provides a method for measuring a mass for an ion species from a mass trace by extrapolating the measured masses in the mass trace to zero ion concentration to thereby compensate for ion deflection effects in the mass trace.

In a first aspect there is provided a method (such as a computer implemented method) for measuring (or determining or otherwise estimating) a mass of an ion species in a mass stream. The mass stream is a mass stream emitted from a separation device as a function of a separation parameter. It will be appreciated that the separation device may be any device that can cause analytes from a sample to be separated. For example the separation device may be any of: a liquid (or gas) chromatograph (or chromatography column); an imaging device, such as a matrix-assisted laser desorption ionization (MALDI), or secondary ion mass spectrometry (SIMS) imaging device, and so on.

In this aspect the method comprises obtaining a mass trace for the ion species of the analyte. Ionization of the ions may happen in the separation device or an ionization source downstream of the separation device. The mass trace comprises a set of intensity peaks, each intensity peak having a respective measured mass and a respective signal. It will be appreciated that the measured masses and signal are measured by a mass spectrometer (or mass analyser) from the mass stream. In some embodiments the step of obtaining the mass trace includes operating the mass spectrometer. In other embodiments the operation of the mass spectrometer has occurred previously and the step of obtaining may include retrieving (or otherwise receiving) the mass trace from a storage device.

The method continues by determining the mass of the ion species as an extrapolation of the measured masses of the set of intensity peaks of the mass trace towards a signal zero (which corresponds to or represents a theoretical ion concentration of zero, or substantially zero). The determining may comprise fitting a regression function to the intensity peaks, wherein the regression function relates measured mass to intensity. Typically, the regression function may be any of: a linear function; a polynomial of N order, where N is an integer greater than 1, preferably between 2 and 5. In a preferred embodiment the regression function is a quadratic function (a polynomial of $2^{nd}$ order) or a cubic function (a polynomial of $3^{rd}$ order). The use of a linear function as the regression function is particularly advantageous in providing an optimal balance between accuracy of the determined mass and reducing the number of intensity peaks required for the fitting. Also in this case the efforts to calculate the regression function is optimized. The determining may be performed in response to identifying deflection in the mass trace.

This aspect advantageously allows compensation to be made in the resulting measured mass for deflection of the masses of the intensity peaks due to ions of a similar mass being present in the mass spectrometer.

In embodiments where a regression function is fitted to the intensity peaks it will be appreciated that the regression function may be fitted to the intensity peaks using any suitable fitting algorithm (or scheme). Examples include any of: a least squares fit; a least absolute deviations algorithm; a maximum likelihood type estimation; etc.

In some embodiments the intensity peaks in the set correspond to a separation event having a start value for a separation parameter, an end value for the separation parameter, and an apex (or centre) value for the separation parameter.

In some embodiments the step of determining the mass of the ion species is performed in response to identifying deflection in the mass trace.

In some embodiments the method further comprises partitioning the set of intensity peaks into at least two subsets of intensity peaks. The method then continues by determining a first estimate of the mass of the ion species as an extrapolation of the measured masses of the first subset towards a signal zero and determining a second estimate of the mass of the ion species as an extrapolation of the measured masses of the second subset towards a signal zero. The measured mass of the ion species may then be accepted (or rejected) based on a comparison of the first estimate and the second estimate.

The first subset may comprise intensity peaks measured at a value of the separation parameter between the start value and the centre value, and the second subset may comprise intensity peaks measured at a value of the separation parameter between the centre value and the end value. In further embodiments intensity peaks with an intensity that is outside a predetermined threshold of the maximum intensity of the separation event are excluded from the set of intensity peaks.

In some embodiments said obtaining step comprises identifying the set of intensity peaks from a plurality of intensity peaks of the mass trace by applying an event detection algorithm.

In an embodiment where the separation device comprises a chromatograph, the separation parameter typically is the retention time. However it will be appreciated that retention time may be used as a proxy measure for other physio-chemical properties such as any of: ion mobility; pH; ion size; collision cross section; polarizability; etc.

Additionally, or alternatively, the separation parameter may comprise any one or more physio-chemical properties, such as: ion mobility; pH; ion size; collision cross section; polarizability; etc.

In an embodiment where the separation device comprises a mass spectrometry imaging device, the separation parameter typically represents a surface location of a sample provided to the mass spectrometry imaging device.

In an embodiment the method further comprises generating a corrected mass trace for the ion species based on the determined mass of the ion species. The corrected mass trace may be generated based on the determined mass of the ion species and/or the regression function fitted as part of the step of determining the mass of the ion species.

In an embodiment the step of obtaining a mass trace further comprises receiving the mass spectrometry data. The mass spectrometry data comprising a plurality of mass spectra each obtained for respective values of the separation parameter.

The step of obtaining a mass trace continues by identifying, from the plurality of mass spectra, a sequence of three or more intensity peaks that are ordered according to the separation parameter. Said identifying the sequence of three or more intensity peaks comprises selecting an initial intensity peak at an initial measured mass, and for each other intensity peak of the sequence of intensity peaks, selecting said intensity peak based on at least the measured mass of an adjacent intensity peak in the sequence of intensity peaks.

A mass trace, for a given emitted compound of the mass stream, is provided from the identified sequence of intensity peaks. Typically, the mass trace is formed from at least the identified intensity peaks.

The step of identifying a sequence of three or more intensity peaks may be carried out in the alternate by selecting an initial intensity peak at an initial measured mass and an initial value of the separation parameter to form part of a mass trace, and repeatedly selecting further intensity peaks at further values of the separation parameter to form part of the mass trace based on at least the measured mass of one or more previously selected intensity peaks at adjacent values of the separation parameter.

This embodiment advantageously allows more complete mass traces to be provided for the further analysis of the method, with a greater reliability in the presence of m/z deflections in the mass spectrometry data such as those described above. This is because the method effectively follows the mass trace along its path and is thus able to track smooth deflections in the m/z direction.

The invention also provides apparatus corresponding to, and comprising elements, modules or components arranged to put into effect the above methods, for example one or more various suitably configured computing devices such as those described previously.

In particular the invention therefore provides a system (or apparatus) for measuring (or determining) a mass of an ion species in a mass stream. The system comprises a mass trace receiver module configured to obtain a mass trace for the ion species.

The system further comprises an extrapolation module arranged to determine the mass of the ion species as an extrapolation of the measured masses of a set of intensity peaks of a mass trace towards a signal zero.

The system also may comprise a output module arrange to provide, as output, the determined mass of the ion species.

The invention also provides one or more computer programs suitable for execution by one or more processors, such computer program(s) being arranged to put into effect the methods outlined above and described herein. The invention also provides one or more computer readable media, and/or data signals carried over a network, which comprise (or store thereon) such one or more computer programs.

BRIEF DESCRIPTION OF THE DRAWINGS

Embodiments of the invention will now be described, by way of example only, with reference to the accompanying drawings, in which:

FIG. 1c shows two example mass traces as may be generated by the system in FIG. 1a;

FIG. 1d shows a further two example mass traces as may be generated by the system in FIG. 1a;

FIG. 3a schematically illustrates a logical arrangement of an example analysis system, such as that which may be used in the system in FIG. 1a;

FIG. 3b schematically illustrates a method for obtaining a mass trace from mass spectrometry data that may be carried out (or implemented by) the analysis system of FIG. 3a;

FIG. 6a schematically illustrates a logical arrangement of an example analysis system, such as that which may be used in the system in FIG. 1a;

FIG. 9b shows an experimental graph of intensity peaks of mass traces from the LC/MS experiment of FIG. 9a;

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 1A:
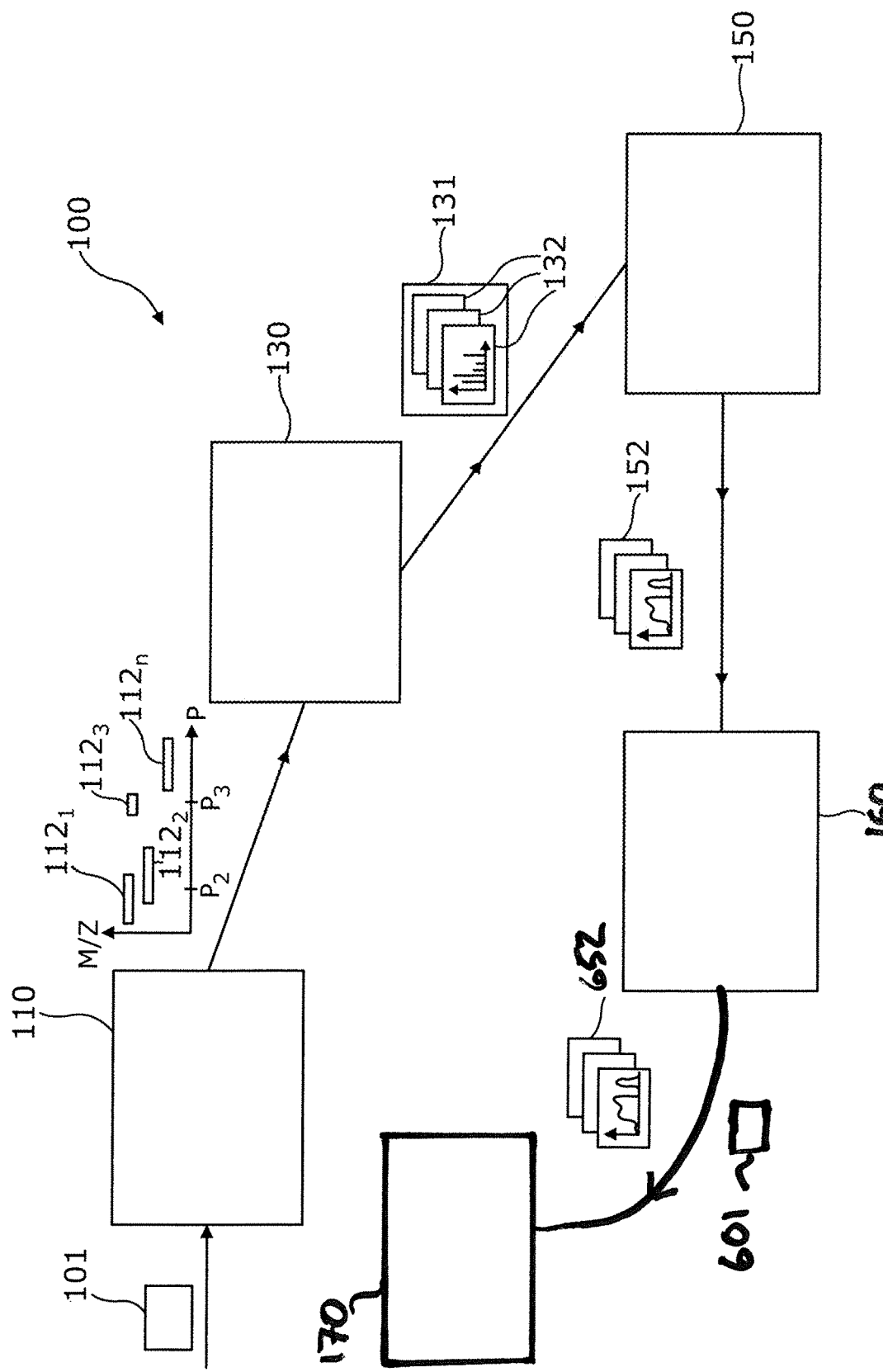
FIG. 1a schematically illustrates an example system for coupled separation/mass spectrometry analysis of a sample.

FIG. 1a schematically illustrates an example system 100 for coupled separation/mass spectrometry analysis of a sample 101. The system 100 is shown as comprising a separation device 110, a mass spectrometer 130, a mass trace analysis system 150, a mass correction module 160, and a further processing module 170.

The separation device 110 is configured to separate an introduced sample 101 into a plurality of its components (or analytes). In particular, the separation device 110 is usually configured to cause components (or analytes) of $112_1$, $112_2$, ... $112_n$ of the introduced sample 101 to elute (or emit or otherwise emanate) from the separation device 110 as a function of a separation parameter (or dimension). The separation parameter (or parameters) may also be thought of as an elution parameter, especially where the separation device comprises a chromatograph or chromatography column. The analytes are typically emitted by the separation device 110 as a mass stream (or an ion stream), which may then be introduced (or injected) into a mass spectrometer 130 as described shortly below. It will be appreciated that this mass stream may be a continuous flow of various analytes or it may be pulsed depending on the rate at which the analytes are separated from the sample 101.

For example, the separation device 110 may be a liquid (or gas) chromatograph, of the types commonly known in the art. In this example the elution parameter would be retention time. In other words the duration of time needed for the component to pass through the chromatograph (e.g. the time between the sample being injected into the device and the component being provided to the mass spectrometer 130). As liquid (and gas) chromatographs are well known in the art they will not be described further herein.

In another example the separation device 110 may be an imaging device of the type used in mass spectrometry imaging (such as matrix-assisted laser desorption ionization (MALDI), or secondary ion mass spectrometry (SIMS) imaging). In these examples the sample 101 comprises a surface which is scanned, usually by an ionising beam (such as an ion beam or laser). Typically, the ionising beam causes a component (or components) 112 to emanate (or emit) from the position on the surface of the sample 101 on which the beam is focussed. As the beam scans the sample 101 the components 112 are emitted as a function of the scan path. In this way it will be appreciated that the separation parameter may be a coordinate on the surface of the sample 101, or a parameter indicating the scan order of the beam (such as a pixel in a raster scan). As mass spectrometry imaging is well known in the art it will not be described further herein.

Besides the many variants of chromatography and imaging, many other separation devices and methods are known in the art, including ion mobility and differential ion mobility separation, electrophoresis, separation by binding to (elements of) an array of binding agents.

The separation device 110 is coupled to a mass spectrometer 130. In particular, the separation device 110 is configured to provide the emitted components to the mass spectrometer 130. These components 112 are introduced, typically by injection, into the mass spectrometer 130. The mass spectrometer 130 may be arranged to ionise (and optionally fragment) the injected components 112. Alternatively the components 112 provided by the separation device 110 may already be ionised. For example where the separation device 110 is an ion mobility separator or an imaging device (such as in a MALDI device), the components 112 will often be ionised by the separation device 110. In this way it will be appreciated that the separation device 110 may be the ion source of the mass spectrometer 130.

The mass spectrometer 130 is arranged to generate a mass spectrum 132 of relative abundance (or intensity) against the mass-to-charge ratio (i.e. m/z value) of the ionised fragments (or components 112). A mass spectrum 132 is described in further detail shortly below. It is known that the generation of a mass spectrum 132 may involve separation or selection of the ionised components according to their m/z value, followed by the measuring of a signal or signals caused by these separated groups of ions and/or ionised fragments. The separation or selection of the ionised components can happen in that ions of a specific m/z value have specific trajectories, on which these ions oscillate. Due to this oscillation, characteristic signals of the ions can be detected which have a frequency $\omega$ and from which a specific m/z value can be assigned. The operation of mass spectrometers is well known in the art and not described further herein. The skilled person would appreciate that the mass spectrometer 130 may be of any type. For example the mass spectrometer may be any one of: a mass spectrometer comprising an ion trap (such as a linear ion trap spectrometer), a time of flight (TOF) mass spectrometer, a Fourier transform ion cyclotron resonance mass spectrometer (FT-ICRMS), an electrostatic ion trap mass spectrometer (an example of which being an Orbitrap™ mass spectrometer).

The components 112 are typically received by the mass spectrometer 130 as a function of the separation parameter. In this way it will be appreciated that the mass spectrometer 130 receives components 112 emitted at the same value (or within the same range of values) of the elution parameter simultaneously (or substantially simultaneously). Consequently, the mass spectrometer 130 is arranged to generate mass spectra 132 as a function of the separation parameter. In other words each mass spectrum 132 is generated for a respective value of the elution parameter. More specifically, each mass spectrum 132 may be thought of as (or representing) a mass spectrum 132 of the components 112 emitted at a respective value of the elution parameter. Each mass spectrum 132 need not be a full mass spectrum in the sense of a complete intensity vs m/z plot across the entire m/z range. For example, a mass spectrum 132, as referred to herein, may comprise one or more m/z vs intensity data points. The mass spectrum 132 may be limited to a particular m/z range of interest. In an extreme case a mass spectrum 132 may comprise only the centroids within a particular m/z range of interest.

Thus, it will be understood that the mass spectra 132 form a data set with at least the dimensions of: intensity (or abundance); m/z (or mass); and elution parameter. The mass spectrometer 130, therefore, is arranged to produce mass spectrometry data (or coupled separation/mass spectrometry data) 131. The mass spectrometry data 131 comprises the plurality of mass spectra 132 each obtained for respective values of the separation parameter.

Indeed some devices, such as some time-of-flight mass spectrometers may not provide mass spectrometry data 131 as an ordered set of plotted mass spectra 132 with respect to separation parameter. Instead the mass spectrometry data may be a stream of m/z-intensity value pairs, with associated values of the separation parameter.

For example a Hadamard transform time-of-flight instrument or a similarly operated device may provide a sequence of mass arrival times that requires deconvolution for determination of the parameter of the separation dimension.

It will be understood that such mass spectrometry data may still be said to comprise mass spectra 132 since, as set out above, a mass spectrum 132 may simply be thought of as a data set with the dimensions of intensity (or abundance); m/z (or mass) at a given value (or range of values) of the separation parameter.

It will be appreciated that a given component 112 may emit from the separation device 110 over a range of the separation parameter p. Typically, over this range the abundance of the component 112 may rise to a peak and then fall.

However in some cases, such as mass spectrometry imaging, there may be a sharp discontinuity in the abundance of a component. This may be, for example, where the component is present only in a sharply defined area of the sample 101 surface that is scanned by a beam, as described above.

As such, it will be appreciated that in each mass spectrum 132 (or mass spectrum data set 132) in the mass spectrometry data 131, there will be a number of m/z intensity peaks (typically represented as centroids)—i.e. a local maxima in the intensity value with respect to m/z in a single mass spectrum 132. There will also, however, be a number of separation parameter intensity peaks—i.e. local maxima in intensity with respect to separation parameter in the mass spectrometry data 131 for a specific component with its specific m/z value.

The ranges of the separation parameter over which two or more components are emitted may overlap. For example, in a chromatograph, a given component may elute over a period in retention time. In the description that follows, for ease of discussion, examples will typically be given with reference to scenarios involving the use of chromatograms. It will be appreciated, however, that the discussions are not limited to these examples and that discussion involving elution and the elution parameter apply equally to more general separation devices where the terms emitting and separation parameter (or their other alternatives set out above) may be used instead.

For example as shown in FIG. 1a, a first component $112_1$ is first to elute, with respect to the elution parameter. Before the first component $112_1$ finishes eluting with respect to the elution parameter, a second component $112_2$ starts to elute. Thus there is a range of the elution parameter within which both the first component $112_1$ and the second component $112_2$ simultaneously elute, and are thus simultaneously injected into the mass spectrometer 130. A mass spectrum $132_{p_2}$ generated for a value of the elution parameter $p_2$ in this range will include m/z intensity peaks for both the first component $112_1$ and the second component $112_2$.

Conversely, as shown in FIG. 1a, a third component $112_3$ is third to elute, with respect to the elution parameter, and does so whilst no other component 112 is also eluting. Thus, a second mass spectrum $132_{p_3}$ generated for a value of the elution parameter $p_3$ in the range where the third component $112_3$ elutes will include m/z intensity peaks for just the third component $112_3$.

The analysis system 150 is arranged to receive the mass spectrometry data 131 generated by the mass spectrometer 130. The analysis system 150 may be (or comprise) one more computer systems, such as a computer system 200 described in more detail shortly with reference to FIG. 2. The analysis system 150 is arranged to generate one or more mass traces 152, based on the mass spectra 132 in the received mass spectrometry data.

Figure 1B:
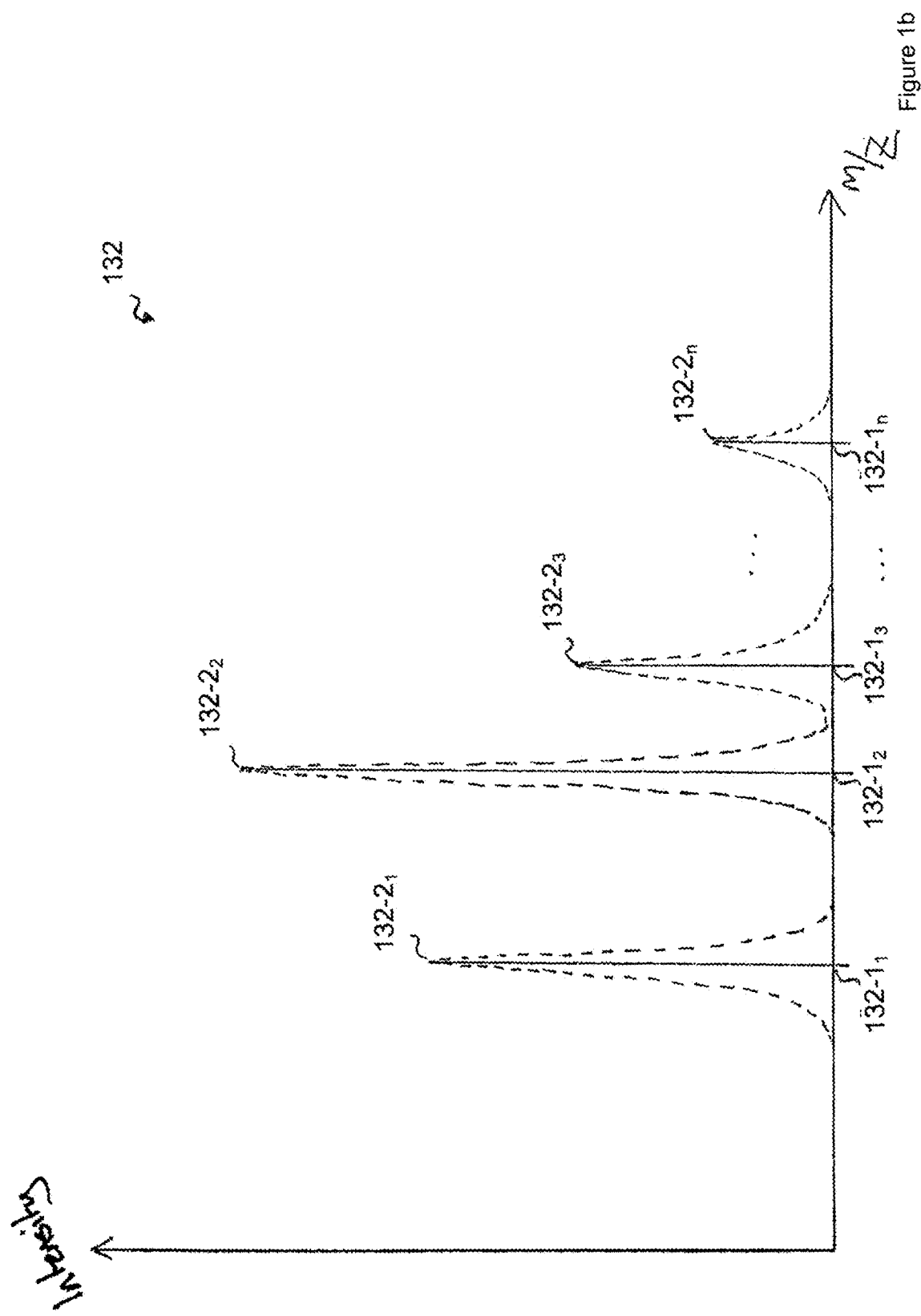
FIG. 1b shows an example graphical representation of a mass spectrum.
Figure 1C:
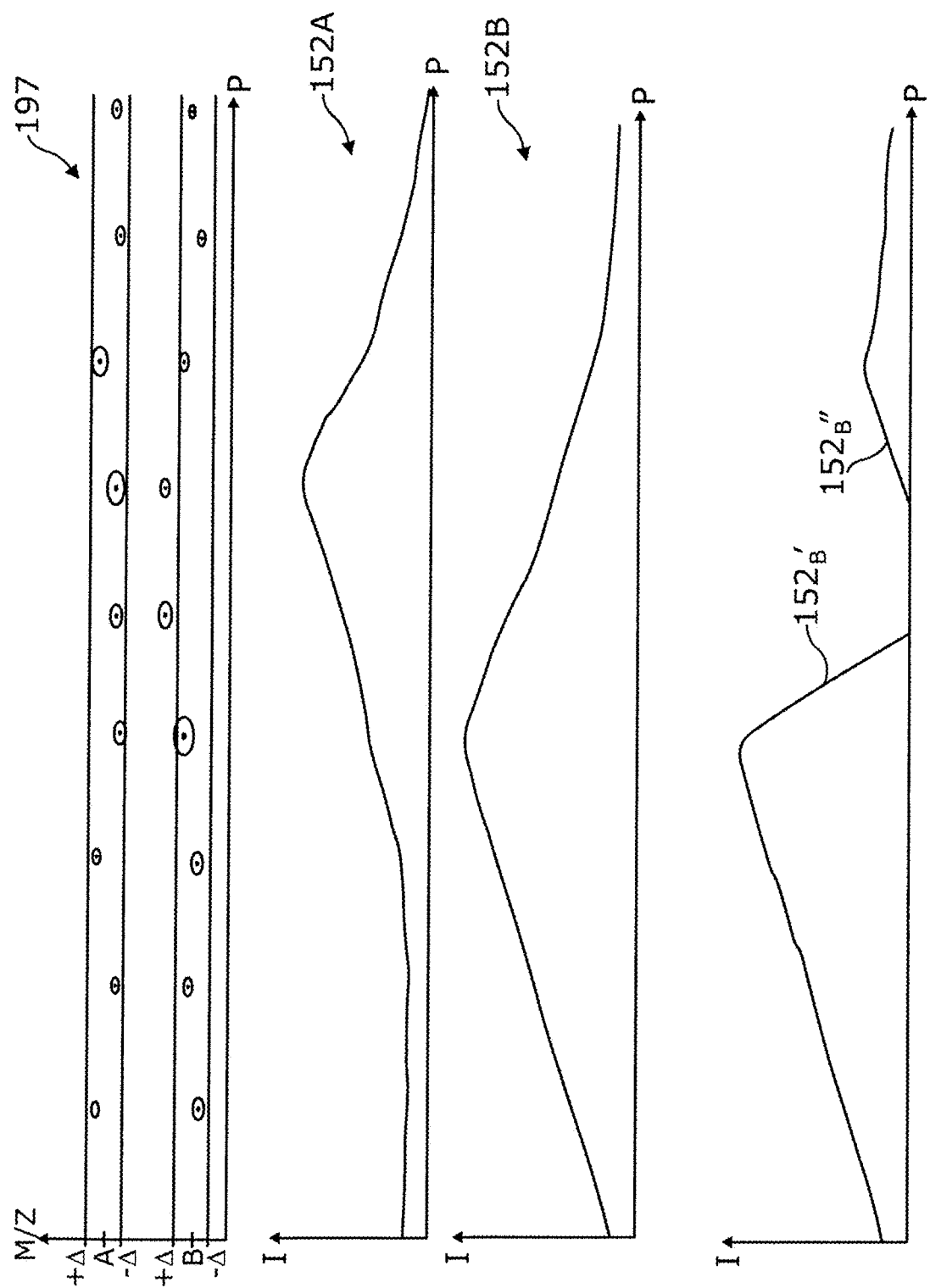

A mass trace 152, such as the example mass trace $152_A$ shown in FIG. 1c, typically comprises a set of m/z intensity (or relative abundances) peaks (or centroids) as a function of the elution parameter, for a particular ion fragment of a component 112 eluted from the sample 101. As each mass spectrum 132 typically corresponds to a respective different value of the elution parameter, each centroid in the mass trace 152 comes from a respective different mass spectrum 132.

One particular example of a mass trace 152, in the case where the separation device 110 is a chromatogram, is an extracted ion chromatogram which is well known in the art.

The mass correction module 160 is arranged to receive the generated mass traces 152. The mass correction module 160 is arranged to calculate (or determine or otherwise generate) a mass 601 for the generated mass trace 152. The mass may be understood as corrected (or real) mass (or mass to charge ratio m/z) of the ion fragment (or species) of the particular mass trace 152. The calculated (or determined) mass may be output by the mass correction module 160 as part of a corrected mass trace 652. The mass correction module 160 may be implemented on (or using) one more computer systems, such as a computer system 200. The mass correction module 160 may be implemented as part of the analysis system 150.

It will be appreciated that the corrected (or real) mass to charge ratio m/z of an ion species is (or approximates) the physical mass to charge ratio m/z of an ion species. Such a real mass to charge ratio can be observed, if no deflection in m/z space occurs. For example this can be achieved if the ion species has been filtered (such as by a quadruple filter in a mass spectrometer) so that it is the only species analysed in the mass analyser in order to measure the mass to charge ratio.

The further processing module 170 is arranged to receive the generated mass traces 152 and/or the corrected mass traces 652 and/or the determined masses 601. The further processing module 170 is then arranged to perform further processing techniques on the generated mass traces 152 and/or the corrected mass traces 652 and/or the determined masses 601 in order to identify particular eluted compounds 112 and/or information regarding the structure and composition of the sample 101.

Mass traces are often useful for processes such as: the re-examination of data to detect previously-unsuspected analytes; the highlighting of potential isomers, the resolving of suspected co-eluting substances; and the providing of clean chromatograms of compounds of interest.

There are numerous such processing techniques known in the art which rely on accurate mass traces 152, including the Compound Discoverer and Proteome Discoverer software products from Thermo Scientific. In the Proteome and Compound Discoverer products, the mass traces 152 may be used as input for an event (or peak) detection algorithm that determines (or identifies) events of relevance in the data. These events may then be used for a variety of different processes, including: chromatographic alignment, comparison of similar events in different chromatographic runs (for example for determination of the relative amounts and/or presence or absence of certain proteins in different samples), and for the determination of the relative amounts of metabolites of pharmaceutical products formed in an organism under different conditions.

It will be appreciated that improved mass traces typically lead to more correctly recognized chromatographic peaks. This in turn may lead to more correctly identified and quantitated peptides. This is important in many scenarios, for example differential expression experiments where better relative protein quantitation can be obtained. Determining which proteins change in abundance under different circumstances ultimately helps identifying correlations of proteins with states of disease or response to treatment. Thus as a consequence the diagnosis of a state of health of a patient may be improved by improvements of the determination of mass traces. Indeed, without accurate mass trace determination, signals significant for treatment may be irrecoverably lost early on in the data evaluation process, as set out in "Current challenges in software solutions for mass spectrometry-based quantitative proteomics" by Cappadona et al. in Amino Acids (2012) 43:1087-1108.

Another use of mass traces 152 is shown in Biller, J. E. and Biemann, K. (1974) "Reconstructed Mass Spectra, A Novel Approach for the Utilization of Gas Chromatograph-Mass Spectrometer Data", Analytical Letters, 7:7, 515-528. Here mass traces are used to correlate fragment ions with their respective parents in GC-MS. A similar method is discussed in U.S. Pat. No. 9,312,110, where the parent ions are in separately acquired full MS spectra and the fragment ions are acquired in $MS^2$ spectra, which may be generated by many known methods for dissociation of ions.

In the case of mass spectrometry imaging, the mass traces 152 may be processed to identify separate regions on the surface of a sample. Known methods from visual imaging (such as watershed methods), may be used on the mass traces to separate the regions. Additionally it is possible to guide the region separation based on external information, which may for example be derived from optical or electron microscopy of the same sample.

FIG. 1*b* shows an example graphical representation of a mass spectrum 132.

The mass spectrum 132 comprises one or more measured m/z values (or mass to charge ratios) 132-1$_i$ (where i is simply an index which runs from 1 to n). Each measured m/z value corresponds to a respective ionic species and may be equal to the molecular mass of the respective ionic species divided by the absolute elemental charge of the respective ionic species. The mass spectrum 132 comprises one or more intensity values 132-2$_i$ with each intensity value 132-2$_i$ appearing for a respective measured m/z value 132-1$_i$. Each intensity value 132-2$_i$ correlates to the relative abundance of the ionic species corresponding to the respective measured m/z value 132-1$_i$. Each intensity value 132-2$_i$ may be proportional to the relative abundance of the ionic species corresponding to the respective measured m/z value.

An experimental mass spectrum such as the mass spectrum 132 may be plotted (or represented) in the form of a continuum plot, indicated by the dashed line, and a centroid plot, indicated by the vertical solid lines. The widths of peaks indicated by the dashed line represent the limit of the mass resolving power, which is the ability to distinguish two different ionic species with close m/z ratios.

However it will be appreciated that the mass spectrum 132 does not need to be plotted (or stored) in the form of a graph. Indeed, the mass spectrum 132 may be represented in any suitable form. For example, the mass spectrum 132 may be represented as a list comprising the one or more intensity values 132-2$_i$ and the one or more measured m/z values 132-1$_i$. In some cases the mass spectrum 132 may simply be represented as a list of centroids (or local maxima), each centroid being represented as a measured m/z value and intensity value pair.

As there are many techniques commonly used in the art for obtaining such centroids from mass spectrometry data these will not be discussed further herein. However, it will be appreciated that the techniques described herein may be performed on lists of centroids forming mass spectra 132, or on raw mass spectra 132 where suitable techniques are used to identify the intensity maxima (or centroids).

FIG. 1*c* shows two example mass traces 152$_A$; 152$_B$ as may be generated by the system 100.

In FIG. 1*c* there is shown a graph 197 plotting centroids (or intensity peaks) from the mass spectra 132 as the measured m/z value of each centroid vs. the value of the elution parameter of the mass spectrum 132. Said centroid forms part of the intensity of each centroid is indicated by the diameter of the circle surrounding the point for ease of visualization. As can be seen there are two clear sequences of centroids centred around m/z values A and B respectively, present in the graph 197. These represent the elution of two compounds, one with a signature m/z value of A and another with a signature m/z value of B. As can be seen there is a slight variation of measured m/z value with respect to elution parameter which is typically caused by the inherent accuracy of the mass spectrometer. This accuracy can vary with respect to the number of ions present in the mass spectrometer, which itself tends to rise and fall over the elution of a given compound.

For both the mass trace 152$_A$ for the m/z value of interest A, and the mass trace 152$_B$ for the m/z value of interest B, the respective mass trace 152$_A$; 152$_B$ is a plot of the intensity of the centroids around the respective m/z value of interest, against the value of the elution parameter for those centroids. In the case where the separation technique was a chromatographic technique the elution parameter will be the retention time and the mass trace will be an extracted ion chromatogram for the m/z value of interest.

To account for the slight variation in measured m/z values, prior art mass trace extraction techniques typically form a mass trace by including all of the centroids with m/z values within a certain range Δ, either side of the m/z value of interest, as shown in FIG. 1*c*. This range (typically 2Δ) is often known as the mass window (or mass window width) and is pre-defined, frequently either specified by a user or software architect, or determined programmatically from other information. In particular the mass window may be generated based on the mass spectrometer type and/or resolution settings. In other words, the mass window is used to take account of the fact that there is a finite accuracy in the measured m/z values reported by a mass spectrometer, causing variation in measured m/z values from one mass spectrum to the next.

However, it has now been observed that the measured m/z values of two nearby centroids in the same spectrum may be deflected. Typically the centroids are deflected towards each other (or in some case one of the centroids, typically the less intense centroid, is deflected towards the other centroid). However, as the deflection may be due to general effects of interactions of ions within the mass analyzer, the centroids may be deflected away from each other in some cases. In either case, this can lead to some of the centroids being deflected outside of the mass window Δ around the m/z value of interest, as can be seen in the graph 197 in relation to the centroids for the m/z value of interest B. This is despite the fact that those centroids are still related to the m/z value of interest B for the same eluted compound as the centroids within the mass window.

This leads to erroneous mass traces being generated, such as the mass traces 152$_{B'}$ and 152$_{B''}$. Here, due to the missing centroids outside of the mass window, two separate mass traces are generated. Each of these two erroneous mass traces has an associated respective peak (or event) in intensity with respect to the elution parameter. In this example, the first peak is located at the same value of the elution parameter as the peak of the true mass trace 152$_B$. However, the shape of the first peak differs from that of the true peak. This shape difference, combined with the erroneous second peak may prevent identification of the eluting compound that led to this mass trace. In some cases due to the unusual truncated shape of the two erroneous peaks they may simply be discarded by the analysis system preventing identification of the eluting compound. Alternatively, the two erroneous peaks may lead to a misclassifying of the eluted compound, for example further analysis may assume that the two erroneous peaks were the result of two separately eluting compounds.

Even in cases where the deflection of nearby centroids as described above is not enough to cause centroids to fall outside of the mass window $\Delta$ of prior art mass trace extraction techniques, the deflection may still lead to inaccuracies in the generated mass traces.

Figure 1D:
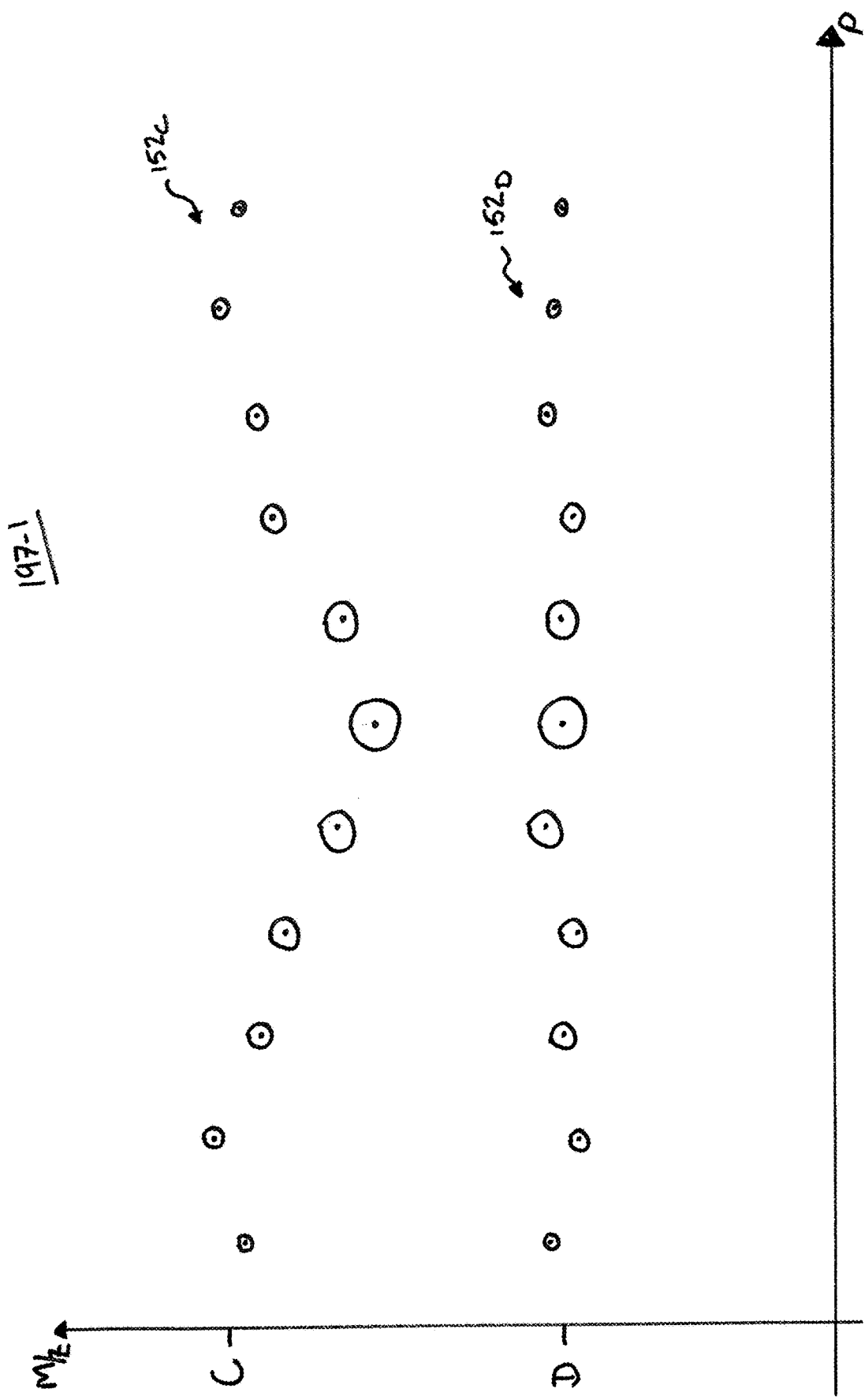

For example, in FIG. 1d there is schematically shown a graph 197-1. This graph is the same the graph 197 shown in FIG. 1c, with the following exceptions. In the graph 197-1 there are two clear sequences of centroids centred around m/z values C and D respectively. These represent two different ion components (or fragments) C and D of the elution of a particular compound, one with a m/z value of C and another with a m/z value of D. As can be seen with the centroids centred around m/z value D there is a slight variation of measured m/z value with respect to elution parameter which is typically caused by the inherent accuracy of the mass spectrometer.

As can be seen in FIG. 197-1 the centroids related to the m/z value of C are deflected towards the centroids related to the m/z value of D. This arises for the same reasons as the deflection described above with respect to FIG. 1c. In the present scenario of FIG. 1d the deflection is due to other ion fragments (such as in particular isotopologues) of the same eluting compound, which may be termed auto-coalescence—i.e. ion fragments of the same eluting compound are coalescing in the mass spectrometer thereby causing a shift in the measured m/z values for one or both of the fragment ions. In a similar way the scenario described above with respect to FIG. 1c may be may be termed hetero-coalescence—i.e. ions (or ion fragments) of the differing eluting compounds, with overlapping elution times, are coalescing in the mass spectrometer thereby causing a shift in the measured m/z values for one or both of the ions (or ion fragments).

The FIG. 1d there is also schematically shown a mass trace $152_C$ for the m/z value of interest C, and a mass trace $152_D$ for the m/z value of interest D. The respective mass trace $152_C$; $152_D$, before, is a plot of the intensity of the centroids around the respective m/z value of interest, against the value of the elution parameter for those centroids.

However, in the methods of the prior art the m/z value of the component for mass trace $152_C$ is calculated as either:
the measured m/z value of the most intense centroid of the mass trace related to the m/z value of C; or
an average (such as a mean) of the measured m/z values of the centroids of the mass trace related to the m/z value of C.

As will now be appreciated, the deflection of the centroids related to the m/z value of C introduces an error in the m/z value calculated by such methods of the prior art. In particular, in the prior art the measured m/z values of the centroids are expected to be correct to within 1-2 ppm. As will be shown shortly below, the described deflection of measured m/z values of centroids may be as much as 30 ppm. This can therefore, lead to significant errors in the prior art calculations of m/z values for affected mass traces.

Figure 2:
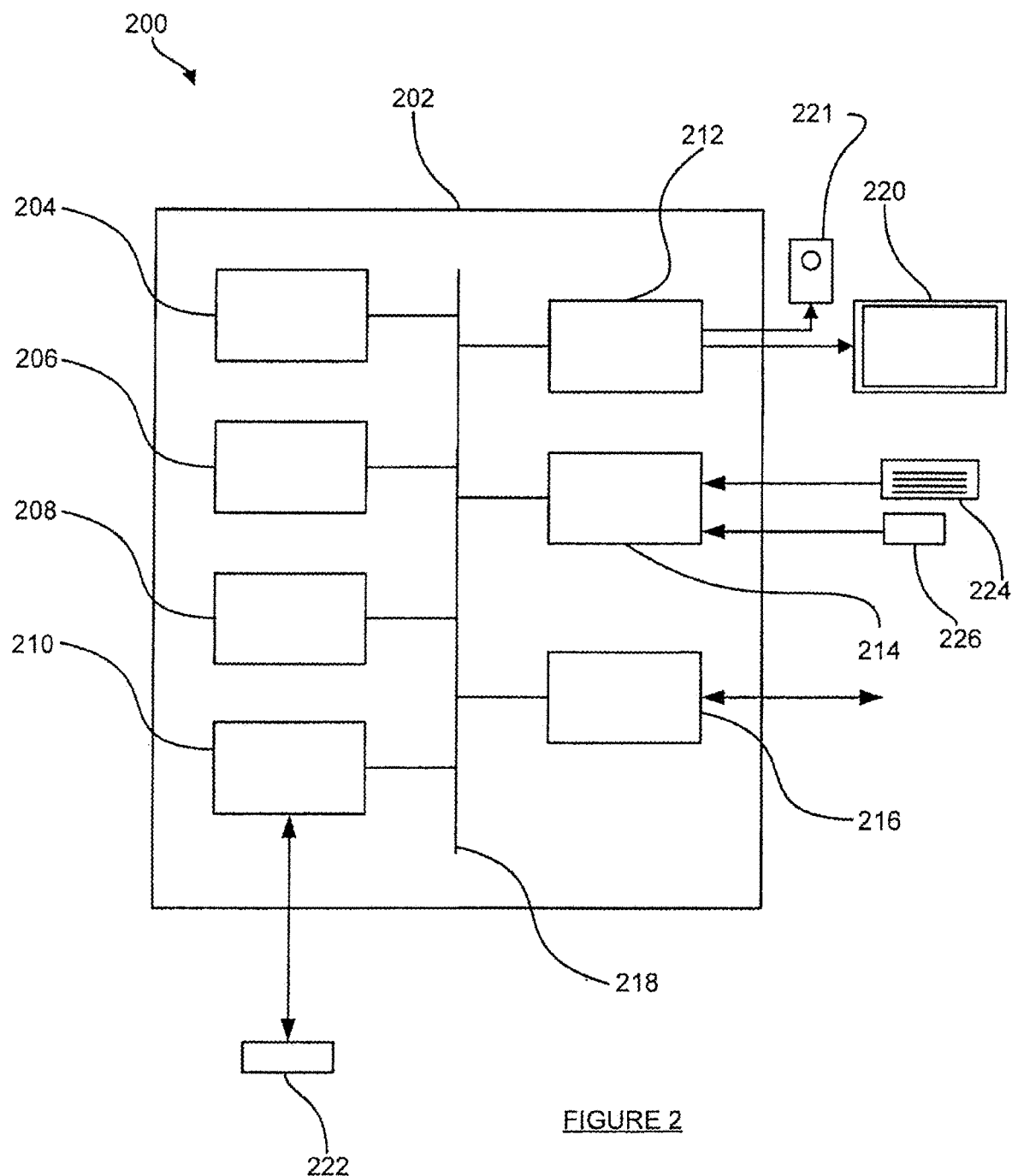
FIG. 2 schematically illustrates an example of a computer system which may be used in the invention.

FIG. 2 schematically illustrates an example of a computer system 200. The system 200 comprises a computer 202. The computer 202 comprises: a storage medium 204, a memory 206, a processor 208, an interface 210, a user output interface 212, a user input interface 214 and a network interface 216, which are all linked together over one or more communication buses 218.

The storage medium 204 may be any form of non-volatile data storage device such as one or more of a hard disk drive, a magnetic disc, an optical disc, a ROM, etc. The storage medium 204 may store an operating system executable by the processor 208. The execution of the operation system by the processor 208 may be required for the computer 202 to function. The storage medium 204 may also store one or more computer programs (or software or instructions or code).

The memory 206 may be any random access memory (storage unit or volatile storage medium) suitable for storing data and/or computer programs (or software or instructions or code).

The processor 208 may be any data processing unit suitable for executing one or more computer programs (such as those stored on the storage medium 204 and/or in the memory 206), some of which may be computer programs according to embodiments of the invention or computer programs that, when executed by the processor 208, cause the processor 208 to carry out a method according to an embodiment of the invention and configure the system 200 to be a system according to an embodiment of the invention. The processor 208 may comprise a single data processing unit or multiple data processing units operating in parallel, separately or in cooperation with each other. The processor 208, in carrying out data processing operations for embodiments of the invention, may store data to and/or read data from the storage medium 204 and/or the memory 206.

The interface 210 may be any unit for providing an interface to a device 222 external to, or removable from, the computer 202. The device 222 may be a data storage device, for example, one or more of an optical disc, a magnetic disc, a solid-state-storage device, etc. The device 222 may have processing capabilities—for example, the device may be a smart card. The interface 210 may therefore access data from, or provide data to, or interface with, the device 222 in accordance with one or more commands that it receives from the processor 208.

The user input interface 214 is arranged to receive input from a user, or operator, of the system 200. The user may provide this input via one or more input devices of the system 200, such as a mouse (or other pointing device) 226 and/or a keyboard 224, that are connected to, or in communication with, the user input interface 214. However, it will be appreciated that the user may provide input to the computer 202 via one or more additional or alternative input devices (such as a touch screen). The computer 202 may store the input received from the input devices via the user input interface 214 in the memory 206 for the processor 208 to subsequently access and process, or may pass it straight to the processor 208, so that the processor 208 can respond to the user input accordingly.

The user output interface 212 is arranged to provide a graphical/visual output to a user, or operator, of the system 200. As such, the processor 208 may be arranged to instruct the user output interface 212 to form an image/video signal representing a desired graphical output, and to provide this signal to a monitor (or screen or display unit) 220 of the system 200 that is connected to the user output interface 212.

Finally, the network interface 216 provides functionality for the computer 202 to download data from and/or upload data to one or more data communication networks.

It will be appreciated that the architecture of the system 200 illustrated in FIG. 2 and described above is merely exemplary and that other computer systems 200 with different architectures (for example with fewer components than shown in FIG. 2 or with additional and/or alternative components than shown in FIG. 2) may be used in embodiments of the invention. As examples, the computer system 200 could comprise one or more of: a personal computer; a server computer; a laptop; a mobile telephone; a tablet; other mobile devices or consumer electronics devices; cloud computing resources; network attached devices; etc.

Figure 3A:
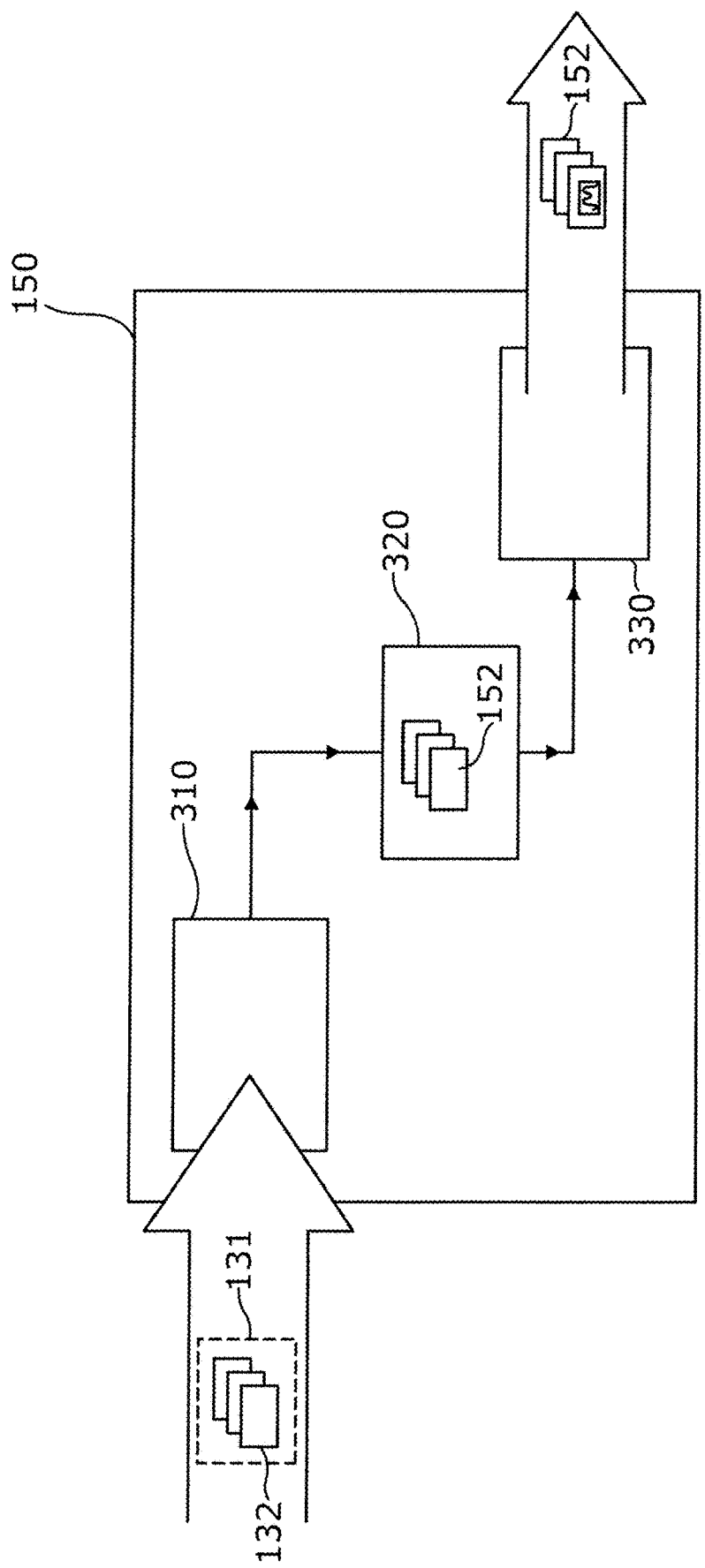

FIG. 3a schematically illustrates a logical arrangement of an example analysis system 150, such as that which may be used in system 100. The analysis system 150 comprises a receiver module 310, a mass trace generation (or extraction) module 320, and mass trace processing module 330.

The receiver module 310 is arranged to receive mass spectrometry data 131. Typically, the receiver module 310 is arranged to receive the mass spectrometry data from a mass spectrometer coupled to (or connected to) the analysis system 150. However, it will be appreciated that the receiver module 310 may be arranged to receive the mass spectrometry data 131 from any suitable source, including a data storage device, a cloud computing service, a test data generation program etc. As set out previously, the mass spectrometry data 131 comprise a plurality (or series) of mass spectra 132 generated by a mass spectrometer 130 in dependence on an elution parameter (such as retention time).

The mass trace generation module 320 is arranged to extract (or obtain) one or more mass traces 152, based on the received mass spectra 130. In particular, the mass trace generation module 320 is arranged to identify a sequence, ordered according to the elution parameter, of three or more intensity peaks from the mass spectra of the received mass spectrometry data 131. As part of identifying the sequence, the mass trace generation module 320 is usually arranged to select an initial intensity peak from the mass spectra 132. The initial intensity peak may be selected based on an m/z value (or range) of interest. It will be appreciated that such an m/z value (or range) of interest may be specified in many different ways, such as by a user, by other analysis of the mass spectrometry data 131, based on known properties of the sample 101 etc. As set out shortly below, the initial intensity peak may be selected based on a sampling of the mass spectrometry data 131. Beginning with the initial intensity peak, the mass trace generation module 320 is arranged to select the further intensity peaks of the sequence by following (or tracking) the mass trace, as a function of the elution parameter. In other words the mass trace generation module 320 is arranged to, for each further intensity peak of the sequence of intensity peaks, select said further intensity peak based on an adjacent already selected intensity peak in the sequence.

The mass trace processing module 330 is arranged to provide the extracted one or more mass traces 152. Usually the mass trace processing module 330 is arranged to plot the intensity of the sequence of centroids as a function of the elution parameter. It will be appreciated that such a plot is not limited to a graphical representation and may include any of a list of coordinate (or plotted points); one or more parameterized curves representing the intensity of the sequence of intensity peaks as a function of the elution parameter; and so on.

FIG. 3b schematically illustrates a method 350 for obtaining a mass trace 152 from mass spectrometry data 131 that may be carried out (or implemented by) the analysis system 150.

A step 360 comprises the receiver module 320 receiving mass spectrometry data 131 comprising a plurality of mass spectra 132 each obtained for respective values of an elution parameter.

A step 370 comprises the mass trace generation module 320 extracting a mass trace 152, based on the received mass spectra 132. The step 370 comprises the mass trace generation module 320 identifying a sequence of three or more intensity peaks from the plurality of mass spectra 132, the sequence of intensity peaks being ordered according to the elution parameter. In particular, an initial intensity peak at an initial measured m/z value is selected from the mass spectra 132. For each other intensity peak of the sequence of intensity peaks, said intensity peak is selected based on the measured m/z value of an adjacent intensity peak in the sequence of intensity peaks A step 380 comprises the mass trace processing module 330 providing the extracted mass trace 152. The step of providing may comprise any one or more of: display of the mass trace 152; storage of the mass trace 152; transmission of the mass trace 152 (such as to a downstream system or processing method), and so on.

It will be appreciated that the steps 370 and 380 may be repeated for the same mass spectrometry data 131, for example to extract a plurality of mass traces 152 for different m/z values of interest. It will also be appreciated that the step 370 may be repeated in order to extract a plurality of mass traces 152, and that the step 380 may be performed a single time in respect of the extracted mass traces 152.

Typically, the step 370 is performed for each intensity peak in the first (or initial with respect to the elution parameter) mass spectrum 132 of the plurality of mass spectra, which has an intensity peak. In other words a mass trace 152 is started for each intensity peak in such first mass spectrum 132. The mass spectra are then usually considered sequentially and a new mass trace started for any further intensity peak which does not form part of an existing extracted mass trace—i.e. the step 370 is also performed for each intensity peak in the subsequent mass spectra which is not part of an existing mass trace 152. In this way it can be assured that as many mass traces 152 are extracted as possible, and that every intensity peak in the mass spectra is considered for inclusion in a mass trace.

Figure 4:
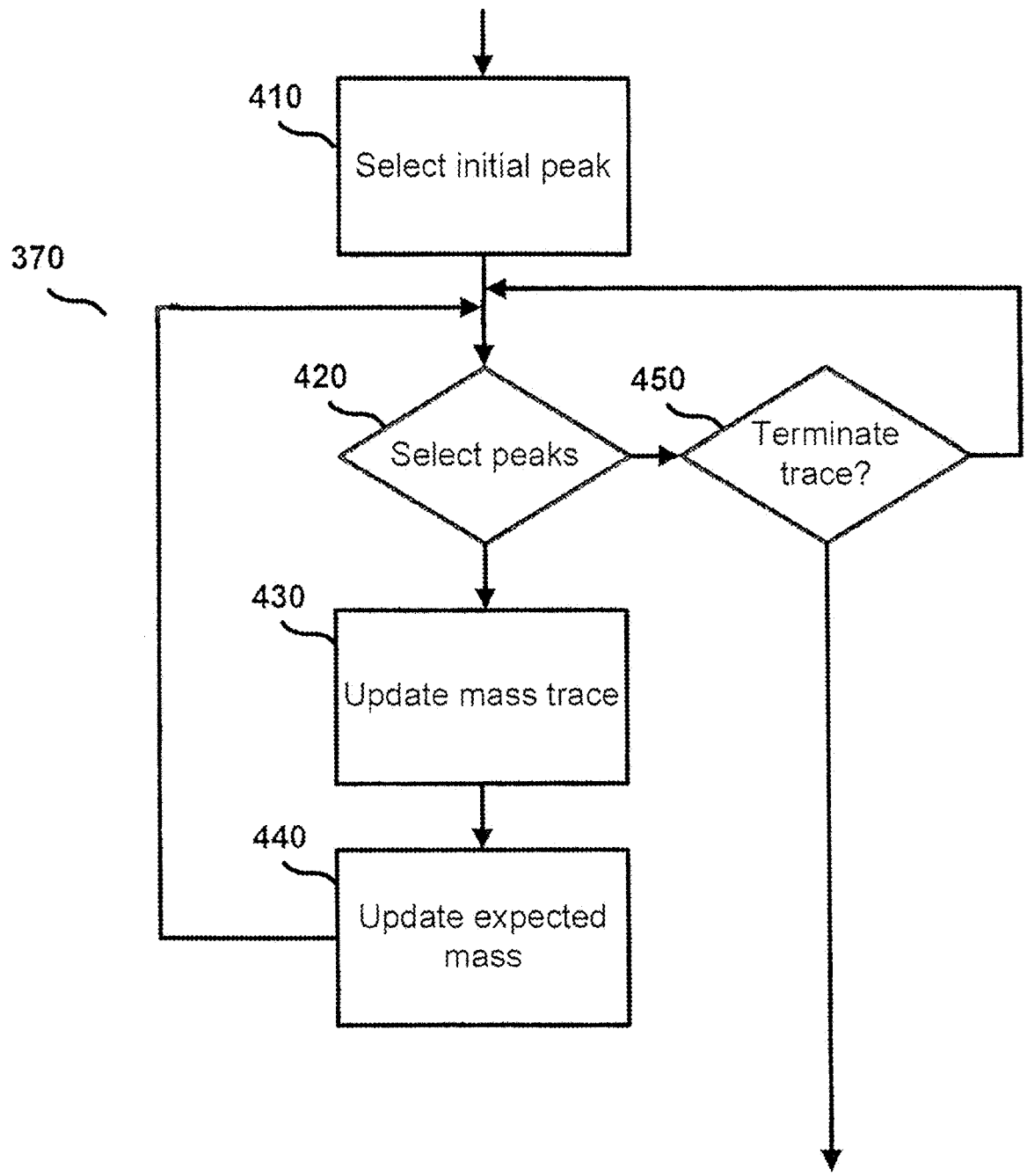
FIG. 4 is a flow diagram schematically illustrating an example implementation of a mass trace generation step for use in the method shown in FIG. 3b.

FIG. 4 is a flow diagram schematically illustrating an example implementation of a mass trace generation step 370 for use in the method shown in FIG. 3b.

A step 410 comprises selecting an initial intensity peak at an initial measured m/z value of a mass spectrum 132. Often, as set out above, the step 370 is performed multiple times on the same mass spectrometry data 131. In particular, for a given mass spectrum 132 an attempt at extracting a mass trace 152 may be made for each intensity peak (or centroid) in the mass spectrum 132. As such the initial intensity peak may simply be selected in this manner. Additionally, or alternatively one or more m/z values of interest may be specified by a user. The initial intensity peak may be selected based on the one or more m/z values of interest. For example the intensity peak that has the closest measured m/z value to the m/z value of interest may be selected. Also at the step 410 an expected m/z value is set based on the measured m/z value of the initial intensity peak. Typically, the expected m/z value is set equal to the measured m/z value of the initial intensity peak.

It will be appreciated that there are many known ways to select an initial peak for the purposes of generating a mass trace. Typically, a pre-determined intensity threshold is used and an intensity peak in excess of the threshold is selected. Advantageously the peak picking may use the phase of peaks and thresholds are dynamically determined relative to the noise background in the spectra and the background information is preserved. Such methods are set out in U.S.

Pat. No. 7,962,301 which is incorporated herein in its entirety. Additionally, or alternatively properties of the mass analyzer may be exploited to reduce the false negative rate, for example as shown, for FT/MS instruments, in U.S. Pat. No. 7,987,060 which is incorporated herein in its entirety.

A step 420 comprises selecting one or more intensity peaks in the next mass spectrum 132 that have a measured m/z value within a m/z range (or mass tolerance) of the expected m/z value. Typically, the step 420 comprises determining (or identifying) whether one or more intensity peaks in the next mass spectrum 132 have a measured m/z value within a predefined range of the expected m/z value. This m/z range may be (or comprise) the mass window as described previously. In this way it will be appreciated that the predefined range may be constant over the step 370. Alternatively the predefined range may vary over the step 370, as set out shortly below. In the case where more than one intensity peak is identified in the step 420, the step 420 may comprise selecting all of the intensity peaks. Alternatively, the step 420 may comprise selecting one of the intensity peaks to include in the sequence of intensity peaks. Such selecting may comprise selecting the intensity peak that has the nearest measured m/z value to the expected m/z value of interest. Alternatively, the selecting may be based on the expected m/z value (or values) of interest of one or more adjacent mass traces 152. For example, intensity peaks that have a measured m/z value nearer to the expected m/z value of an adjacent mass trace 152 than to the expected m/z value of the current mass trace 152 may be discarded. Then, from the remaining identified intensity peaks the intensity peak that has the nearest measured m/z value to the expected m/z value of interest may be selected. In the case where all of the identified intensity peaks have been discarded in this way the control flow moves to the "no" branch which is described shortly below.

If one or more intensity peaks in the next mass spectrum 132 having a measured m/z value within a predefined range of the expected m/z value are selected, then the control flow moves to a step 430.

The step 430 comprises including in the sequence of intensity peaks the intensity peak selected in the step 420. In the case that more than one intensity peak was selected by the step 420 an average intensity peak based on the selected intensity peaks may be included in the sequence of intensity peaks. Additionally, or alternatively all selected peaks may be included in the mass trace.

A step 440 comprises updating the expected m/z value based on at least the measured m/z value of the intensity peak included in the sequence of intensity peaks in the step 430. In some cases the expected m/z value may be set to the measured m/z value of the intensity peak included in the sequence of intensity peaks in the step 430. Typically, the expected m/z value is updated based on (or to be or to be proportional to) an average of the measured m/z values of the previous intensity peaks in the sequence.

The average may be a windowed average where only the measured m/z values of a pre-defined number of previous intensity peaks are included. The average may, additionally or alternatively, be a weighted average, such as an average weighted by intensity.

Following the step 440 the control flow then moves back to the step 420. Thus it will be appreciated that an intensity peak identified in the step 420 is identified based on at least the measured m/z value of an adjacent intensity peak in the sequence of intensity peaks.

If, following the step 420, no intensity peaks have been selected by the step 420 then the control flow moves to a step 450.

The step 450 comprises determining if the mass trace 152 should be terminated. Typically, the mass trace 152 will be terminated if, for a predefined number of consecutive mass spectra, no intensity peaks have been selected by the step 420. Typically this indicates that the elution of the compound associated with the mass trace has finished. It will be appreciated that other termination criteria may be used. The termination criteria may include predefined and/or dynamically determined criteria in the separation dimension. The termination criteria may include: when the length of the total trace (in the separation dimension) exceeds a multiple of the average expected peak width in the separation dimension. In that case it will be appreciated that it may be expedient to open a new trace with the latest intensity peak being used as the initial intensity peak of the new trace. In imaging scenarios it will be appreciated that the scan may be performed in rows. Here the end of a row may terminate a trace. The termination criteria may depend on the number of intensity peaks already selected as part of the sequence, for example the longer the mass trace the greater the predefined number may be. In this way it will be appreciated that longer mass traces may be more tolerant of gaps or missing intensity peaks then shorter mass traces.

If step 450 determines that the mass trace should not be terminated then the control flow moves to the step 420 which is carried out for the next mass spectrum in the sequence. It will be appreciated that step 450 may be omitted if the termination criteria require the mass trace to be terminated as soon as no intensity peak is selected in the step 420. In this case the step 370 will terminate directly once no intensity peak is selected in the step 420.

Figure 5:
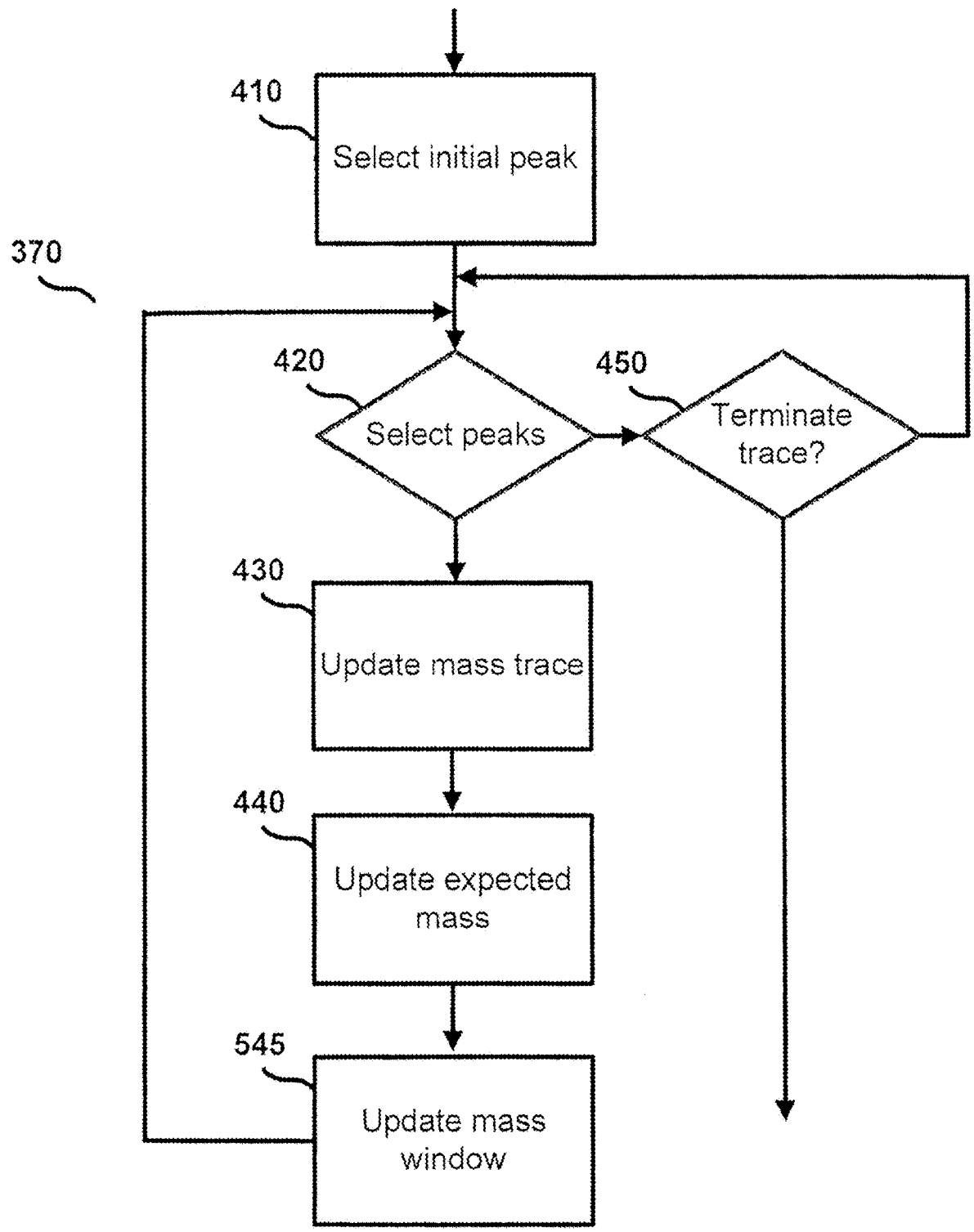
FIG. 5 is a flow diagram schematically illustrating a variant of the example implementation of a mass trace generation step set out in FIG. 4.

FIG. 5 is a flow diagram schematically illustrating a variant of the example implementation of a mass trace generation step 370 set out in FIG. 4. The above discussion of FIG. 4 applies to FIG. 5 except in the following respect.

A step 545 comprises updating the m/z range (or mass window). The m/z range may be updated based on (or be proportional to, or a function of) any of (or any combination of): the resolving power of the mass spectrometer; the expected m/z value; the intensity of the previously selected intensity peak in the sequence; the signal to noise ratio; and so on. Typically, the m/z range will not be updated to be below 0.1 ppm with respect to the expected m/z value. It will be appreciated that in some examples the m/z range may be dependent (or be determined based on) neighbouring (or adjacent) peaks in in the same mass spectrum (i.e. peaks adjacent in the m/z dimension). For example, if a neighbouring peak is close enough in the m/z dimension to the expected m/z value to cause an "attraction" towards the neighbouring peak, then the mass window may be adjusted to take account of said predicted "attraction". Such adjustment may include widening the window and/or shifting the window towards the neighbouring peak. By tracking the mass variation in all mass traces the mass window may be adjusted based on automatically observed trends. For example, a mass window may be functionally dependent on mass and/or intensity. In particular it will be appreciated that lower ions detected by the mass spectrometer with a lower signal-to-noise ratio will show higher mass variability due to the influence of noise. Thus the m/z range may be made inversely dependent on the signal-to-noise ratio.

It will be appreciated that the step 410 may comprise setting the m/z range based on the measured m/z value of the initial intensity peak in a similar manner to step 545 above.

In the example implementation of the method shown in FIG. 5 the following criteria and parameters may be used.

The expected m/z value set in the step 410 and 440 is equal to avg_mz which is the average measured m/z value of the four previously selected intensity peaks in the sequence. Where fewer than four intensity peaks in the sequence have been previously selected all of the previously selected intensity peaks in the sequence are used.

The mass tolerance is tol_amu=MININUM(2avg_mz/res*2/3, 1.5*avg_mz/1e6). The factor of 1.5 may typically be substituted for values between 0.1 and 100. Values close to 0.1 would be most suitable for ultra-high resolution FTMS, whereas values around 100 would be most suitable for time-of-flight mass spectrometry. res is set equal to the ratio of the measured m/z value to the full width half maximum (FWHM) value of the intensity peak—i.e. res=m/z/FWHM.

The predefined number (or maximum gap length) for determining whether or not to terminate the mass trace is maxGapLen=MAXIMUM(len/3, 10) where len is the number of intensity peaks in the sequence when the test is applied. It will be appreciated that the maximum maxGapLen (here set as 10) may be dynamically determined. In particular the maximum maxGapLen may be dynamically determined, based on any of: instrument-type, signal to noise ratio, an observed (or pre-set) chromatographic peak width; etc. Typically a reasonable range is somewhere between 3 to 10 or the average peak width in the used separation method.

The example method is illustrated by the pseudocode given below:

```
FOR EACH ( mass spectrum (elution parameter ascending
order) )
    FOR EACH ( active mass trace (mass ascending order) )
        FOR EACH ( centroid in mass spectrum (mass
        ascending order) )
            IF ( mass centroid is below avg_mz − 1/2 *
            tol_amu )
                No match found: Add centroid to new mass
                trace as initial intensity peak
                CONTINUE (Continue with next mass
                centroid)
            ELSE IF( mass centroid is above avg_mz + 1/2
            * tol_amu )
                No match found: Add centroid to new mass
                trace as initial intensity peak
                BREAK (Continue with next auto
                trace)
            ELSE
                Check whether this or the next mass
                trace has a smaller match to the current
                mass centroid. Assign mass centroid to
                the mass trace with smaller distance
        END centroid
        IF ( no mass centroid was assigned to current mass
        trace )
            Add gap (zero mass centroid) to mass trace
            IF ( maxGapLen points reached )
                terminate mass trace and provide
                terminated mass trace
    END mass trace
END mass spectrum
```

The methods described above with reference to FIGS. 3b, 4, and 5 are logically described, for ease of understanding, from the point of view of extracting a single mass trace at a time. This may be considered as mass trace by mass trace type. It will be appreciated, however, that the present invention is not limited to such an implementation. Alternatively, the methods above may be implemented as a centroid by centroid type. In other words two or more (or all) of the mass traces 150 may be extracted in parallel.

In one example of such a centroid by centroid type, the mass spectra 132 may be considered in order of separation parameter. For a given mass spectrum 132, each centroid in the mass spectrum 132 may be tested, as per step 420, for each of the active mass traces 152 (mass traces 152 that have not been terminated). If the centroid is selected for a given mass trace, the centroid is added to that mass trace 152 (as per step 430) and the expected m/z value, and optionally, the m/z range is updated for that mass trace 152. If a centroid is not selected for any active mass trace 152, then a new mass trace 152 may be started using said centroid as the initial intensity peak. Once all of the centroids for the mass spectrum 132 have been considered then the termination criteria is applied to the active mass traces 152 for which no new centroid has been added. Any mass traces fulfilling the termination criteria are not considered further and may be provided to the mass trace processing module 330. The process is then repeated for the centroids in the next mass spectra (in order of separation parameter).

It will be appreciated that the preceding discussion is not limited to selecting intensity peaks in any particular direction (or sense) of the separation parameter. Whilst it is straightforward to visualize the initial intensity peak being at one point value of the separation parameter and subsequently selected intensity peaks being at subsequent values of the separation parameter it is possible to select an initial intensity peak at a high value of the separation parameter and select further peaks going backwards with respect to the separation parameter. It will also be appreciated that further peaks can be selected moving out from the separation parameter value in any direction. For example in mass spectrometry imaging a mass trace may be followed along a diagonal on the surface of the sample.

Additionally, or alternatively a mass trace could be followed both forwards and backwards from a given initial intensity peak, with respect to the separation parameter. Indeed it may be advantageous to re-follow a mass trace backwards once an average mass (or mass centre) has been determined. This may advantageously improve the selection of the initial intensity peak and may lead to the inclusion in the mass trace of preceding peaks that would otherwise not have been considered part of the mass trace. It will also be appreciated that while chromatographic peaks do not tend to be symmetrical in time, it may still appropriate to use the same selection and termination criteria as when moving forward in time.

Figure 6A:
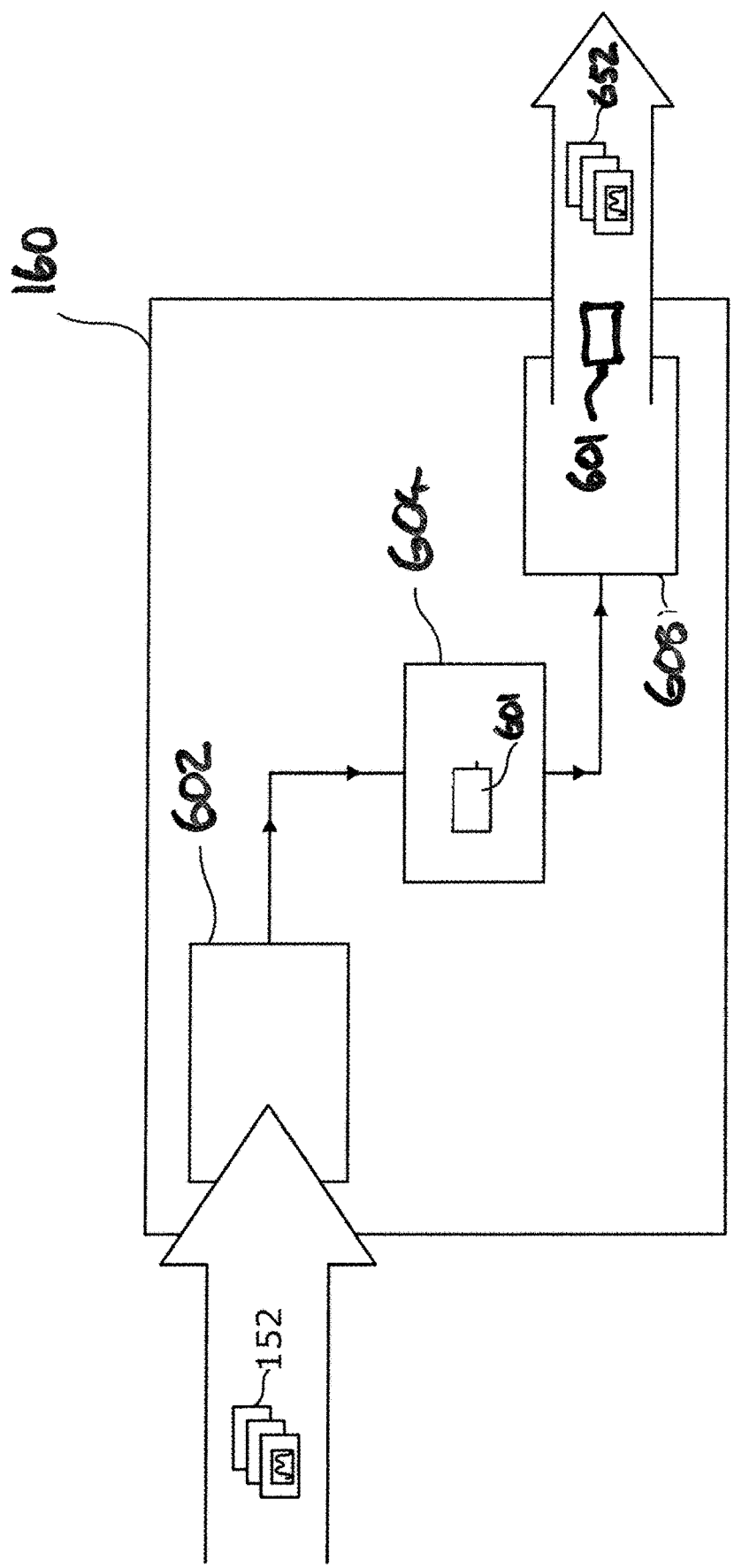

FIG. 6a schematically illustrates a logical arrangement of an example mass correction module 160, such as that which may be used in system 100. The mass correction module 160 comprises a mass trace receiver module 602, an extrapolation module 604, and an output module 608. It will be appreciated that the mass correction module 160 may be implemented on or as part of a computer system, or systems, such as the computer system 200.

The mass trace receiver module 602 is arranged to obtain (or receive) a mass trace 152 for a given ion species in a mass stream. Typically, the mass trace receiver module 602 is arranged to receive the mass trace 152 from the analysis system 150. However, it will be appreciated that the receiver module 602 may be arranged to receive the mass trace 152 from any suitable source, including a data storage device, a cloud computing service, a test data generation program etc.

The extrapolation module is arranged to determine (or calculate or otherwise estimate) a mass (or a corrected mass)

601 for the mass trace 152. This may be understood as the mass of the ion species observed by the mass trace 152. The mass 601 is determined by extrapolating measured m/z values of a set of intensity peaks in the mass trace 152 towards a signal zero, as described in more detail shortly below.

It will be appreciated that the quantity of intensity discussed above is typically a measure of the relative abundance (or number of ions) of an ion species in the mass stream provided to a mass spectrometer. In some cases this intensity is proportional to the signal generated by the mass analyser component of the mass spectrometer. In such cases the intensity is proportional to the number of ions of a measured m/z value in the mass analyser for the given intensity peak.

However, in some cases (such as with electrostatic trap type mass analysers) the number of ions from a mass stream injected into the mass analyser is controlled (such as through automatic gain control) such that at most a maximum number of ions from a mass stream are injected for a given scan. This is may be done, for example, by varying the time period over which the injection takes place. In such cases the intensity is only proportional to the number of ions of a measured m/z value in the mass analyser for the given intensity peak where the total number of ions of the mass stream is below the maximum number of injected ions.

In both cases however the signal (typically a signal to noise ratio as described shortly below) generated by the mass analyser is proportional to the number of ions of a measured m/z value in the mass analyser for the given intensity peak.

In this way it will be understood that the intensity peaks in the set of intensity peaks will each provide the signal for said intensity peak. This may be achieved by the intensity peak comprising the signal. Additionally, or alternatively, the intensity peak may comprise additional data enabling the signal to be determined based on the intensity, such as the time period over which the injection takes place and preferably the noise intensity.

The output module 608 is arranged to provide, as output, the determined mass 601. The output module 608 may be arranged to provide a corrected mass trace 652 for the ion species, generated based on the mass 601, as described in more detail shortly below.

Figure 6B:
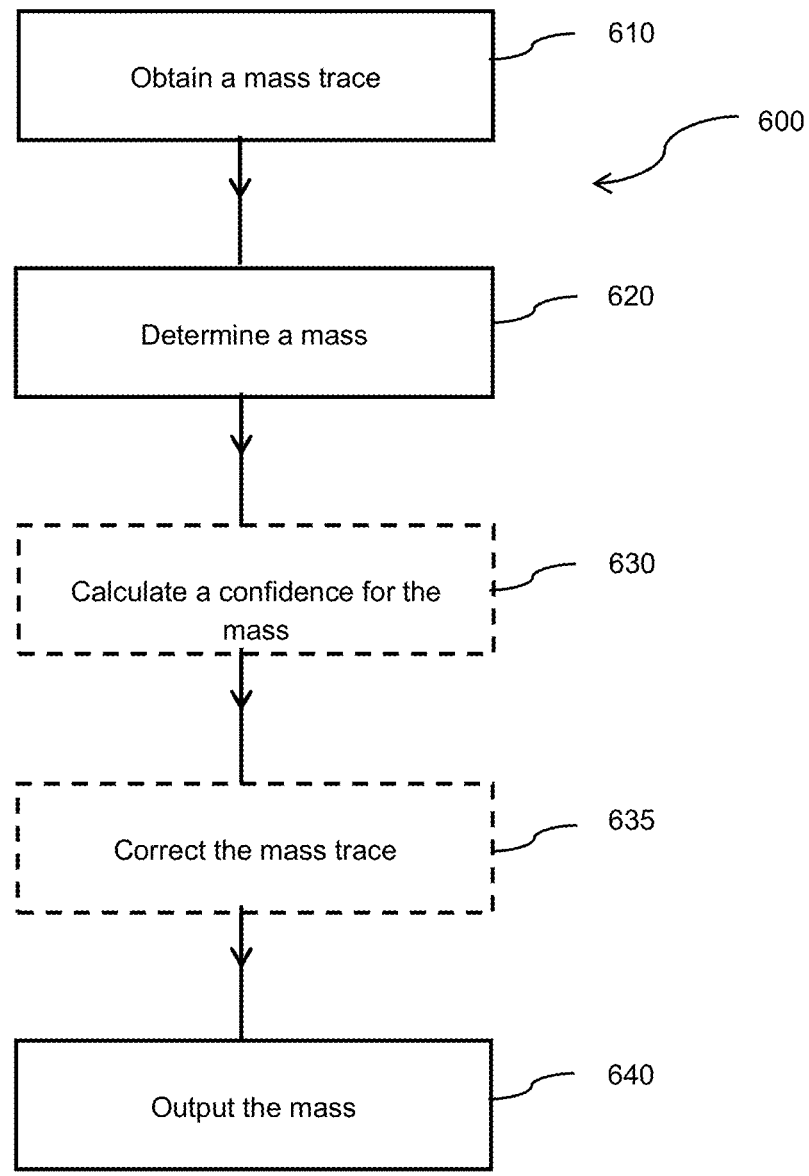
FIG. 6b schematically illustrates a method for obtaining an m/z value, or mass centre, for a mass trace, such as a mass trace generated by the methods in FIGS. 3b-5.

FIG. 6b schematically illustrates a method 600 for determining a mass centre for a mass trace 152, that may be carried out (or implemented by) the mass correction module 160.

A step 610 comprises the mass trace receiver module 602 obtaining a mass trace 152 for a given ion species in a mass stream. The mass trace 152 is as discussed previously with respect to FIGS. 3-5, and comprises a set of intensity peaks, each intensity peak having a respective measured m/z value and a respective intensity. The set of intensity peaks is usually formed as a sequence of intensity peaks being ordered according to the separation (or elution) parameter and correspond to the intensity peaks for a given separation event, as discussed shortly below. The mass trace 152 may be obtained (or received) from a mass trace generation system 150, such as any of the example mass trace generation systems 150 described above in respect of FIGS. 3a, 3b, 4, and 5. Additionally, or alternatively, some or all of the mass trace 152 may be obtained from a storage medium, such as the storage medium 204. Some or all of the mass trace 152 may be received from a remote system, such as a cloud computing system, a network storage device and so on. It will be appreciated that significant time may elapse between the generation of the mass trace 152 and one or more of the steps of the method 600.

A separation event is usually the elution of a particular compound in the separation device 110. For example, where the mass trace 152 is an extracted ion chromatogram, the separation event would be a chromatographic event—i.e. the elution of a particular compound at a particular retention time—to such an event the m/z value of the compound is correlated. Events may be identified by an event detection algorithm as a peak in intensity of the mass trace as a function of separation parameter—i.e. a (typically local) maximum. The value of the separation parameter at which this maximum occurs may be termed the separation parameter centre. Additionally, or alternatively, the separation parameter centre may be set as the value of the separation parameter at which an equipartition of the peak area is given. In higher dimensions this may be equivalent to the geometric centre. It will be appreciated that such an approach may be particularly useful for peaks that do not fit a certain pre-defined model or peak shape. This can often be the case in imaging mass spectrometry.

The set of intensity peaks usually comprises the intensity peaks occurring between the start value of the separation parameter for a given separation event, and the end value of the separation parameter for the separation event. Again, in the example where the mass trace 152 is an extracted ion chromatogram the set of intensity peaks may comprise the intensity peaks between the retention time at which the elution starts and the retention time at which the elution finishes. The value of the retention time corresponding to the intensity maximum would be the separation parameter (in this case the retention time) centre.

The step 610 may comprise identifying the set of intensity peaks from a plurality of intensity peaks of the mass trace 152 by applying an event detection algorithm. As will be appreciated from the discussion above, an event may be identified as a peak in intensity of the mass trace. Alternatively an event detection algorithm may be used which requires other conditions to be satisfied for such a mass trace intensity peak before classifying the peak as an event. For example, the event detection algorithm may require the peak having any one or more of: a minimum area, a minimum conformance to a model peak and or to expected statistical variations, and co-elution with one or more peaks with the same (or substantially the same) value of the separation parameter.

It will be appreciated by a person skilled in the art that there are many known methods for detecting peaks and/or events. In one example a Gaussian curve of the form $He^{-(t-RT)^2/2W^2}$ is fitted to a mass trace 152 using a suitable fitting algorithm (such as a least squares fit). Such a fit would give the intensity of the chromatographic peak of the mass trace as H, the elution parameter centre of the peak as RT, along with the peak width as W.

An overview of peak fitting is given in Data Handling in Science and Technology; Chapters 8 and 11; Volume 21, (1998); Data Analysis and Signal Processing in Chromatography; Edited by Attila Felinger which is incorporated herein by reference in its entirety. The separation (or elution) parameter centre for an event or peak, such as that described above, may be determined as part of the event, or peak detection algorithm. For example, "Quantification and deconvolution of asymmetric LC-MS peaks using the bi-Gaussian mixture model and statistical model selection" by Yu and Peng in BMC Bioinformatics. 2010 Nov. 12, which is incorporated herein by reference in its entirety, suggests peak detection, and subsequent determination of peak centres (such as elution parameter centres) by fitting a bi-Gaussian model to XICs. Such a method is also an example of one that may be used to detect multiple peaks that may be present in the same mass trace (or XIC). Given such event detection algorithms are well known in the art they will not be discussed in further detail here.

A step 620 comprises the extrapolation module 604 determining (or calculating or otherwise estimating) a mass centre 601 for the mass trace 152. The mass 601 is determined by extrapolating the measured m/z values of a set of intensity peaks of the mass trace towards an signal zero (or a zero number of ions). In this way, the determined mass may be understood as an extrapolation of the measured masses the set of intensity peaks towards an signal zero (or a zero number of ions). The mass 601 represents the m/z value of the ion species from whose mass spectra the mass trace was generated. As such, it will be appreciated that the determined mass 601 for a mass trace 152 is effectively the m/z (or mass) value for the component ion (or fragment component ion) detected in the mass trace. The correctness of the mass determined by this approach has been confirmed by control experiments comprising filtering the component ion by a mass filter and analysing the m/z value of the isolated component ion in a mass analyser.

In order to extrapolate the measured m/z values, the step 620 may comprise performing regression analysis (such as linear regression) on the measured m/z values and corresponding signal values of the set of intensity peaks. This may be done by fitting regression function (or curve) to the measured mass value and signal value pairs of the intensity peaks. Such a regression function relates measured m/z values to signal values. This regression function may be fitted to the measured m/z values and corresponding signal values provided by the set of intensity peaks by varying one or more parameters of the regression function. Typically, a linear (or first order polynomial) function may be used as the regression function. Such a regression function would take the form of:

$$M(S)=aS+b$$

where M(S) is the measured m/z value as a function of signal S, with a, and b being the parameters. However it will be appreciated that any suitable N-degree polynomial function may be used as the regression function. There are many well-known fitting techniques in the art of regression calculation that may be used, such as any of: a least squares fitting algorithm; a least absolute deviations algorithm; a maximum likelihood type estimation; etc. As regression analysis, and in particular linear regression, is well known we will not discuss it further herein.

As will be appreciated a minimum number of intensity peaks required for the fitting described above depends on the regression function. For example a linear regression function may be fitted to two or more intensity peaks, a second order polynomial to three or more intensity peaks and so on. In the case of a linear regression function it has be observed that 5 or more, and preferably 7 or more, intensity peaks provide particularly reliable results.

In this way, the value of the regression function at the signal zero provides the determined mass 601 of the ion species, for which the mass trace has been observed. This may be termed the intercept of the regression function (or curve). The signal zero is the signal value corresponding to zero ions of the observed ion species observed by the mass trace in the mass spectrometer 130. As will be understood the signal value generated produced by a mass analyser is typically a signal to noise ratio. It will be appreciated however, that the values of the signal may be represented in other ways, such as any of: a difference between an absolute signal value and a background noise, an absolute signal and measured background noise pair, etc. Alternatively the signal may comprise absolute intensities and a corresponding expected background noise measurement (or estimate). Equally, it will be appreciated that the value of the signal zero may depend on the nature of the signal. For example, the value of the signal zero may correspond to an expected background noise for the mass spectrometer 130. Alternatively, the value of the signal zero may be (or be substantially) equal to zero, and so on. As will be become apparent below the resulting fitted regression function may also be provided as part of the step 620.

As discussed above in some cases the intensity itself will be proportional to the signal. In such cases the intensity value itself may be used in place of the signal value in the extrapolation. Alternatively, as discussed above in some arrangements the intensity is not consistently proportional to the signal. For example, with some electrostatic ion trap spectrometers at high ion intensities only a specific maximum amount of ions may be is injected into the mass analyser. This is typically achieved by a reduction of the injection time at high ion intensities. As a result, at high ion intensities intensity peaks in the resulting mass trace are made at a constant (or substantially constant) ion number, and therefore a constant (or substantially constant) signal to noise ratio is reported for these intensity peaks.

It will be appreciated that, in some embodiments, in such cases the set of intensity peaks may comprise only those intensity peaks for which the intensity is proportional to the signal. If this is the case then the intensity values may be used in place of the signal values in the extrapolation.

An optional step 630 may comprise determining (or calculating or otherwise estimating) a confidence measurement for the determined mass 601 by the extrapolation module 604. The confidence measurement may be (or comprise) a confidence interval for the determined mass. The confidence measurement may be (or comprise or be based on) a goodness of fit measure for the regression analysis of step 620. For example, the confidence measure may be a confidence interval for the value of the regression function at the zero intensity.

Additionally, or alternatively, the optional step 630 may comprise performing one or more quality tests indicating whether or not the mass 601 determined in step 620 is acceptable. A quality test may be carried out based on an expected m/z value variance (or reproducibility). It will be appreciated that for a mass trace 152 not subject to any deflection there would be expected to be a variance in the measured m/z values of the intensity peaks of the mass trace 152. Such variance may be due to measurement errors of the mass spectrometer arising due to the finite accuracy of the m/z measurements made by a mass spectrometer 130. An expected m/z value variance may be determined based on theoretical estimates, based on the accuracy of the mass spectrometer 130 and/or parameters used in the mass scans of the mass spectrometer. The expected m/z value variance might be correlated to the measured signal and the conditions of the measurements. An expected m/z value variance may be calculated based on other mass traces 152 produced in the same separation mass spectrometry experiment as the mass trace 152 of interest. An example method of calculating an expected m/z value variance is provided shortly below.

Another quality test may be based on comparing two or more separate estimates of the mass of the ion species of the investigated mass trace. The separate estimates may be based on respective subsets of the intensity peaks. Examples of such a test are described shortly below. Another quality test is to compare the standard deviation achieved by the linear regression with the observed deviation of the determined mass from a measured mass. If the observed deviation is not at least 2, preferably 3 times higher than the standard deviation of the linear regression, no confidence is given for the determined mass.

The result of the one or more quality tests may be output by the step 630 as one or more respective confidence values (or indications). A confidence value may indicate whether the corresponding quality test was passed or not. As such each confidence value may indicate whether the mass 601 is acceptable, according to the respective test.

An optional step 635 comprises the output module 608 generating a corrected mass trace 652. Where the optional step 630 is present the corrected mass trace 652 may be generated in dependence on the one or more quality tests indicating that the mass 601 is acceptable. Said generating may be carried out based on the resulting fitted regression function provided in the step 620. In particular, as part of said generating, the m/z values of the intensity peaks in the mass trace 152 are shifted so as to compensate for the mass deflection discussed above. In particular, the m/z values of the intensity peaks in the mass trace 152 may be set equal to the determined m/z value 601.

Alternatively, said generating may comprise shifting the m/z value of each intensity peak in the mass trace 152 by the value of the fitted regression function at the respective signal value of said intensity peak. In this way the difference of the regression function and the mass 601 may be understood to be effectively subtracted from the peaks (or mass values of the intensity peak) of the mass trace 152.

In the case where there are more than one quality tests it may be required that all of the tests, or a predetermined number or subset of the tests are passed in order for the generated mass trace 152 to be generated.

It will be appreciated that such correction is advantageous in that it typically allows most if not all of the deflection effect to be removed from a given mass trace whist still retaining the variation in measured m/z values of intensity peaks that arise due to other phenomena, such as instrument accuracy, environmental effects etc. This means that other analysis that may use such variation may still be carried out, whilst reducing any error introduced by the deflection effect of coalescence.

In examples where the mass trace 152 is to be provided with a single mass centre measurement (such as is the case in the prior art mass trace measurement techniques) the single mass centre measurement step 635 may comprise correcting only the single mass centre measurement. This may be achieved by replacing the mass centre measurement with the mass 601 determined in the step 620. Alternatively, the single mass centre measurement may be shifted based on the mass value of the fitted regression function of signal zero.

A step 640 comprises providing the determined mass 601 as the m/z value for the mass trace 152 by the output module 608. Where the optional step 630 is present the determined mass 601 may be provided in dependence on the confidence value indicating that the mass 601 is acceptable. The step 640 may comprise providing an indication that the mass 601 is not acceptable (or not reliable) if the confidence measure, and/or the quality tests of step 630, indicates that mass determined in step 620 is not acceptable. The step 640 may comprise providing the confidence interval for the determined mass 601. The step 640 may comprise providing the corrected mass trace 652 as output. For example, the corrected mass trace 652 and/or the determined mass 601 may be provided to the further processing module 170.

In the above discussion the mass trace 152 is generated using the example analysis system 150 discussed in FIGS. 3a and 3b. It will be appreciated however that the mass trace 152 may be a mass trace 152 identified by known prior art methods, as described previously herein. For example, the analysis system 150 may identify the mass trace using the technique described above in relation to FIG. 1c. Such prior art methods usually provide a mass trace plot of intensity against separation parameter for a given separation event. However, it will be appreciated that such a mass trace plot can be used to identify the corresponding set of intensity peaks from the plurality of mass spectra 132, and thereby allow the mass trace 152, comprising a set of intensity peaks, to be obtained. In this way the method 600 may be used with prior art methods of obtaining mass traces.

Similarly it will also be appreciated that the method 600 above may be carried out by the analysis system 150. For example the mass correction module 160 may be a module of the analysis system 150.

As will be appreciated the system and method set out above in relation to FIGS. 6a and 6b allow compensation to be made in the resulting determined mass for deflection of the measured masses of the intensity peaks due to auto-coalescence as described in relation to FIG. 1d. This is where ion fragments of the same eluting compound are coalescing in the mass spectrometer thereby causing a shift in the measured m/z values for one or both of the fragment ions. The above system and method are also applicable to forms of hetero-coalescence, again allowing compensation to be made in the resulting determined mass for deflection of the measured masses of the intensity peaks. In particular, the system and method are applicable where the ions (or ion fragments) of two different eluting compounds, eluting substantially simultaneously, are coalescing in the mass spectrometer thereby causing a shift in the measured m/z values for one or both of the ions (or ion fragments).

It will be appreciated that as part of the method 600 the mass trace 152 may be analysed (or otherwise examined) to identify whether a mass deflection (such as a coalescence) is present in the mass trace 152. As will be appreciated there are numerous ways in which such a deflection may be identified. For example, a mass change along a mass trace 152 in excess of a pre-determined threshold may identify a mass deflection. Additionally, or alternatively, a standard deviation, for the masses in the mass trace 152) exceeding a pre-determined threshold may identify a mass deflection. Typically, a standard deviation of three times greater (or more) than may be expected for the measurements indicates a mass deviation, preferably a standard deviation of two times greater (or more) than may be expected for the measurement indicates a mass deviation. In some case, the step 620 may be carried out in response to the identification of a mass deflection in the mass trace. For example, where no mass deflection is identified the method may terminate before step 620.

Of course, it will be understood that the method 600 may be carried out on mass traces without analysis to identify whether a mass deflection is present in the mass trace.

Figure 7:
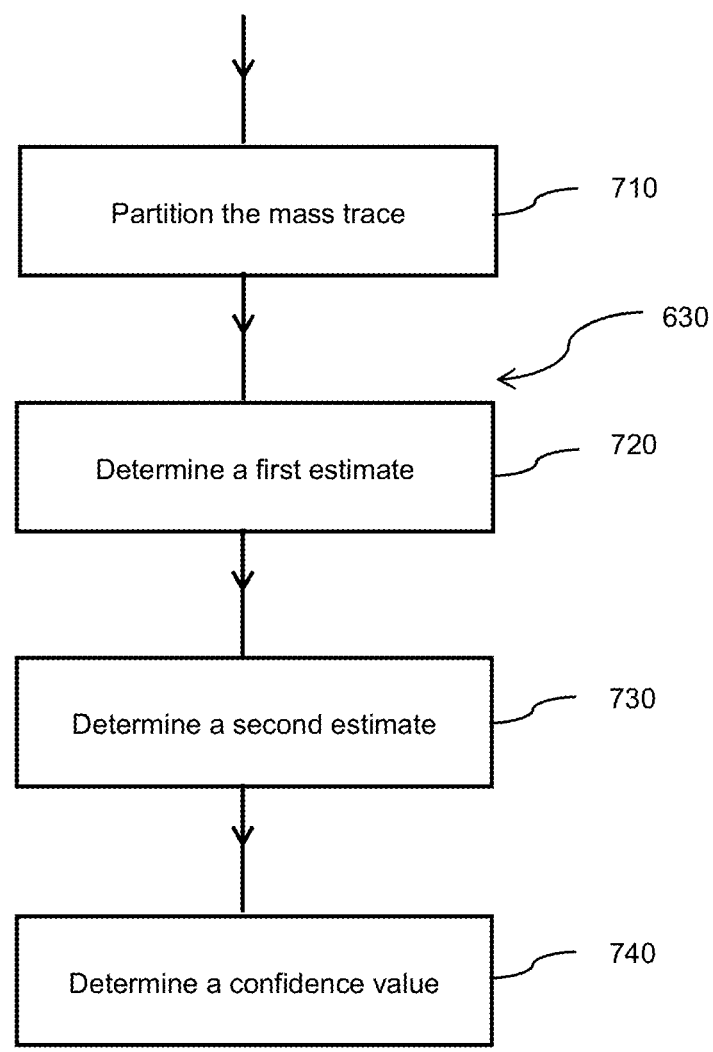
FIG. 7 schematically illustrates a step for determining a confidence measurement for a mass centre that may be used with the method in FIG. 6.

FIG. 7 schematically illustrates a variant step 630 for determining a confidence measurement for the mass centre that may be used with the method 600.

A step 710 comprises partitioning the set of intensity peaks into two or more subsets of intensity peaks. The partitioning in the step 710 may be based on the separation event corresponding to the intensity peaks. For example, the set of intensity peaks may be partitioned based on a separation parameter centre of the event. As such, a first subset of intensity peaks may comprise (or be formed of) some or all of the intensity peaks having a value of separation parameter less than (or less than or equal to) the separation parameter centre. Similarly a second subset of intensity peaks may comprise (or be formed of) some or all of the intensity peaks having a value of separation parameter greater than (or greater than or equal to) the separation parameter centre.

In other words, the intensity peaks in the set may correspond to a separation event having a start value for a separation parameter, an end value for the separation parameter, and a separation parameter centre (or apex) value. The first subset may then comprise intensity peaks measured at a value of the separation parameter between the start value and the separation parameter centre value. The second subset may comprise intensity peaks measured at a value of the separation parameter between the separation parameter centre value and the end value.

A step 720 comprises determining a first estimate of the mass of the ion species as an extrapolation of measured masses of the first subset towards a signal zero.

Similarly, a step 730 comprises determining a second estimate of the mass centre of the ion species as an extrapolation of measured masses of the second subset towards a signal zero.

Both the step 720 and the step 730 may be carried out in the same way as the step 620. In this way it will be appreciated that the discussion of the step 620 above applies analogously to the step 720, with the first estimate of the mass of the ion species in place of the mass, and a set of intensity peaks of the first subset of intensity peaks in place of the set of intensity peaks. Similarly, the discussion of the step 620 above applies analogously to the step 730, with the second estimate of the mass of the ion species in place of the mass, and a set of intensity peaks of the second subset of intensity peaks in place of the set of intensity peaks.

A step 740 comprises determining a confidence value for the determined mass 601 based on a comparison of the first estimate of the mass and the second estimate of the mass. A confidence value indicating the mass 601 is acceptable may be obtained if the first estimate of the mass and the second estimate of the mass agree (or are the same or are within a certain range of deviation). The first estimate of the mass and the second estimate of the mass may be determined as agreeing if they are within a pre-determined threshold of each other (or if their absolute difference is below a threshold value). The threshold value may depend on the regression analysis used to determine the first estimate of the mass and/or the second estimate of the mass. The threshold may be based on the standard deviation or another confidence measure for the first estimate of the mass as determined by the corresponding regression analysis. Additionally, or alternatively the threshold may be based on the standard deviation (or another confidence measure) for the second estimate of the mass as determined by the corresponding regression analysis.

Additionally, or alternatively, the confidence value may be determined based on a similarity of the fitted regression function for the first estimate of the mass resulting from the step 720 (referred to below as the first fitted regression function) and the fitted regression function (referred to below as the second fitted regression function) for the second estimate of the mass resulting from the step 730. The confidence value may be based on a root mean squared value of the difference between the first fitted regression function and the second fitted regression function. For example, a confidence value indicating the mass 601 is acceptable may be obtained if difference between the first fitted regression function and the second fitted regression function is below a pre-determined threshold. Similarly a confidence value indicating the mass centre 601 is not acceptable may be obtained if difference between the first fitted regression function and the second fitted regression function is above a pre-determined threshold. It will be appreciated that the difference between two functions may be calculated in any number of different suitable ways, these may include the following criteria separately or in combination: a mean absolute deviation, a root mean square deviation; a median deviation; the difference at a predetermined signal value (such as a signal zero); the difference in the slope between the functions; etc. Typically, a standard deviation of less than 5 ppm indicates an acceptable mass 601.

In one example, the following protocol may be used to determine the confidence value:

A range, RangeLeft, for the first fitted regression function is constructed as RangeLeft=[MassLeft−StdevLeft, MassLeft+StdevLeft], where MassLeft is the first estimate of the mass and StdevLeft is a standard deviation between the first fitted regression function and the measured m/z values of the intensity peaks in the first subset of intensity peaks used for the fitting.

A range, RangeRight, for the second fitted regression function is constructed as RangeRight=[MassRight−StdevRight, MassRight+StdevRight], where MassRight is the second estimate of the mass centre and StdevRight is a standard deviation between the second fitted regression function and the m/z values of the intensity peaks in the second subset of intensity peaks used for the fitting.

If RangeLeft and RangeRight overlap then a confidence value indicating the mass centre is acceptable is obtained. Otherwise, a confidence value indicating the mass centre is not acceptable is obtained.

It will be appreciated that calculating the confidence value based on the similarity of the first and second fitted regression functions is of particular interest where the event is a chromatographic peak and deflection of the intensity peaks arises due to interaction with other ion species from the same elution at a different m/z value. Here there is a strong expectation that the deflection would be symmetric around the retention time centre.

In a variant of the method 600 described above in relation to FIG. 6b the step 620 may comprise partitioning the set of intensity peaks based on a separation parameter centre of the event as described above in relation to step 710. In particular, the peaks may be partitioned into two subsets of intensity peaks. The first subset of intensity peaks comprise (or be formed of) the intensity peaks having a value of separation parameter less than (or less than or equal to) the separation parameter centre. Similarly the second subset of intensity peaks comprise (or be formed of) the intensity peaks having a value of separation parameter greater than (or greater than or equal to) the separation parameter centre. In this way it will be understood that the determination of the mass may involve extrapolating the measured m/z values of one of the sub sets of intensity peaks towards a signal zero.

This may be particularly advantageous when the intensity peaks of one of the sub sets is subject of hetero-coalescence from a further compound eluting immediately after or before the elution of the compound of interest. In this way the extrapolation may use the other subset of intensity peaks. This may be advantageous as it allows for compensation with respect to auto-coalescence that may be present without requiring account to be made for the hetero-coalescence caused by the elution of the further compound.

The selection of the subset on which to base the extrapolation may be made based on a comparison of the separation event of the mass trace 152 and the separation event for the further compound. In particular, the subset with the minimum overlap with the separation event of the further compound would typically be chosen.

Alternatively, respective extrapolations may be made for both the first subset and the second subset, producing respective masses, may be made in the manner of steps 720 and 730 above. The respective mass with the lowest standard deviation may be then selected as the mass for the ion species. Alternatively the mass for the ion species may be selected form the group of masses including the respective masses determined from the first subset of intensity peaks and from the second subset of intensity peaks and the mass determined form the set of intensity peaks including both subsets. Again, the mass with the lowest standard deviation may be then selected as the mass for the ion species.

Figure 8:
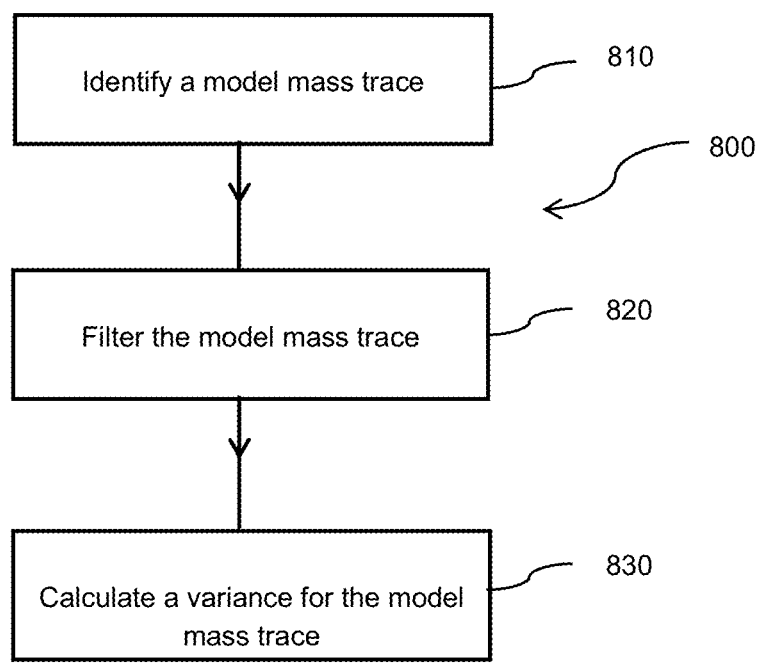
FIG. 8 schematically illustrates a method 800 for determining an expected m/z value variance, or mass reproducibility, which may be carried out as part of the method set out in FIG. 6b.

FIG. 8 schematically illustrates a method 800 for determining an expected m/z value variance (or mass reproducibility), such as for example that may be carried out as part of the step 630 of FIG. 6b.

A step 810 comprises a model mass trace 152 is obtained from the mass spectra 132 produced by the mass spectrometer as part of the separation/mass spectrometry analysis of the given sample 101. The model mass trace 152 will typically be a mass trace 152 comprising a number of intensity peaks exceeding a pre-determined threshold, and/or having an signal (or intensity) exceeding a pre-determined threshold. Typically, where more than one mass trace 152 satisfies these criteria the mass trace 152 having the most intensity peaks is selected as the model mass trace 152. In an example, the model mass trace 152 having the greatest number of intensity peaks, that also has a median (or absolute) signal (as a signal to noise ratio) greater than 20 may be selected as the model mass trace 152. In this example, if no mass trace 152 satisfies the median signal criteria then the mass trace with the highest signal may be selected as the model mass trace. In particular, the mass trace having the highest signal may be selected as the model mass trace.

A step 820 comprises filtering the model mass trace 152 to remove intensity peaks with m/z values outside of a pre-determined range. Typically, the pre-determined range is centred on the mean m/z value of the intensity peaks in the model mass trace 152. The width of the range may be based on the model mass trace 152. For example, the intensity peaks having a measured m/z value more than two standard deviations away from the mean m/z value for the model mass trace 152 may be removed.

It will be appreciated that where the range is determined based on the model mass trace 152, the step 820 may be iterated as intensity peaks are removed to take account of any resulting change in the range. In such a case there may be termination criteria for the iteration. The step 820 may be repeated until the number of peaks remaining in the model mass trace reaches a certain threshold. Additionally, or alternatively the step 820 may be iterated until fewer than a threshold number of peaks are removed in the latest iteration. In either or both cases the thresholds may be based on the original length of the model mass trace 152.

In a particular example the step 820 may be iterated until either:

The number of intensity peaks in the model mass trace 152 is less than half of the number of intensity peaks originally in the model mass trace 152; or The number of intensity peaks removed from the model mass trace 152 in the most recent iteration of the step 820 is less than 5% of the number of intensity peaks originally in the model mass trace 152.

A step 830 comprises calculating a variance for the m/z values of the intensity peaks in the filtered model mass trace 152.

Figure 9A:
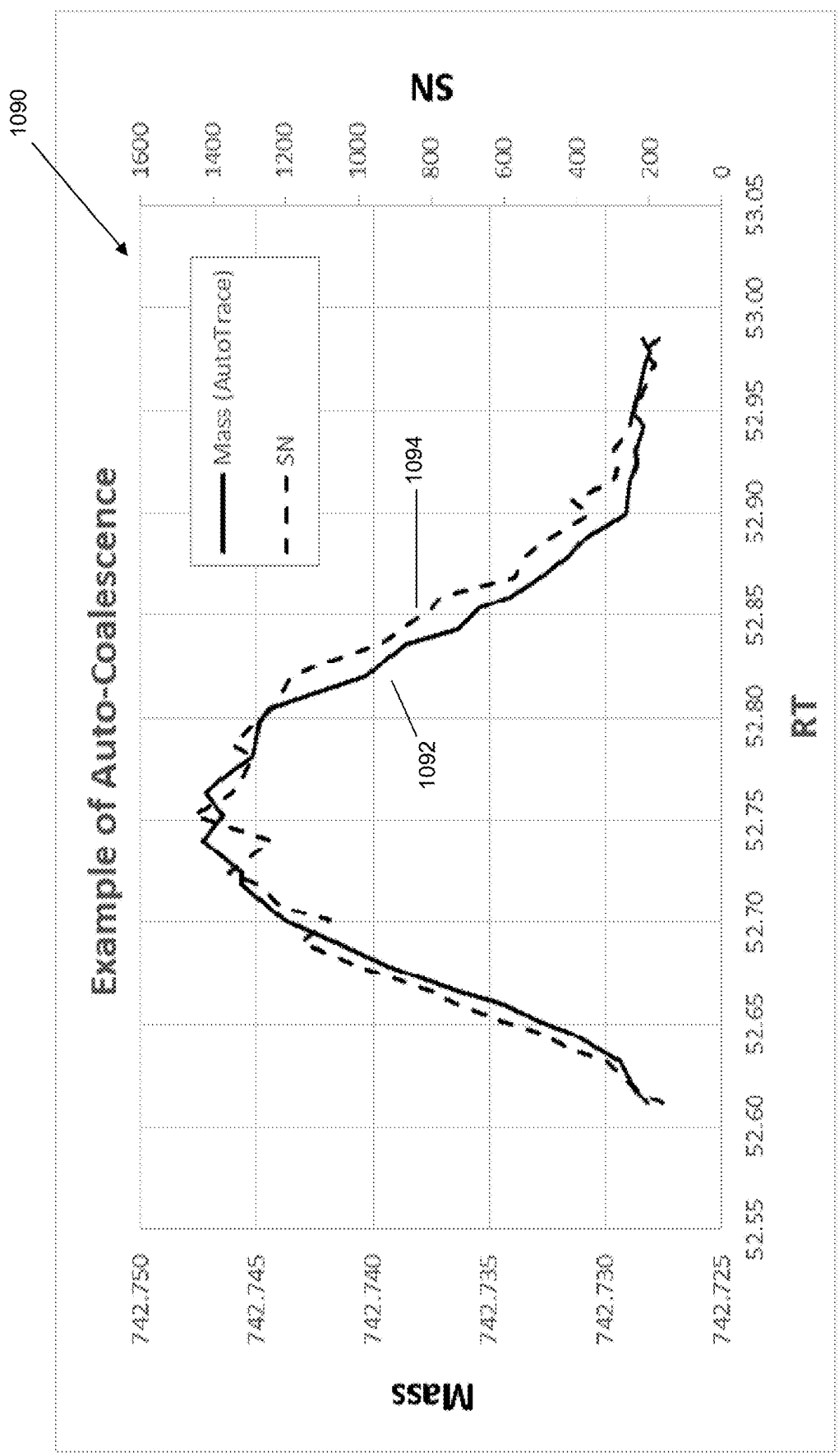
FIG. 9a shows a plot of m/z value against retention time for the measured intensity peaks of an experimental mass trace, and a plot of signal to noise ratios against retention time for the same intensity peaks.

FIG. 9a shows a graph 1090 comprising both a plot 1092 of measured m/z value against retention time (RT) for intensity peaks of an experimental mass trace (A1), and a plot 1094 of signal to noise ratio against retention time for the same intensity peaks. These intensity peaks are derived from an experiment with Q Exactive™ HF LC-MS/MS system, in which an ions of the charge state z=5 of a peptide are investigated. This peptide has been created by digestion of the protein bovine serum albumin. The graph 1090 clearly shows the dependence of measured m/z value deflection on signal to noise ratio discussed above.

Figure 9B:
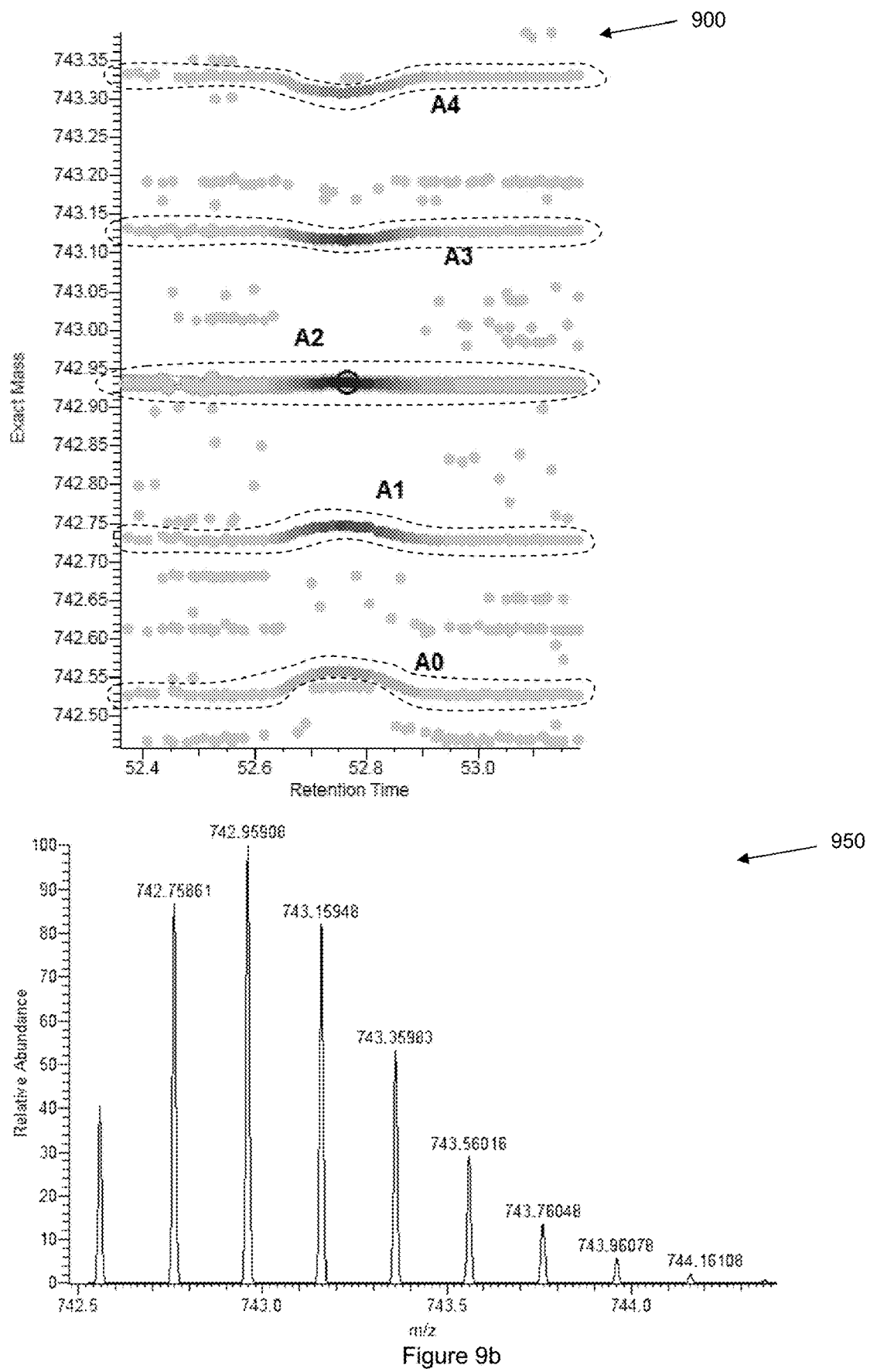

FIG. 9b shows a further experimental graph 900 of intensity peaks for the same LC-MS/MS experiment. The experimental graph 900 is a plot of intensity peaks in given mass scans of the experiment which are plotted as measured mass (labelled exact mass) against retention time. Each intensity peak is plotted as a circle on the plot 900, with the shading of the circle being proportional to the intensity of the intensity peak—the darker the circle the more intense the corresponding peak. So as can be seen the intensity peaks get progressively more intense towards a maximum at around a retention time of 52.75 and progressively less intense afterwards. The experimental graph 900 is as per the graph 197 of FIG. 1d discussed above, and the discussions of the graph 197 apply equally to the experimental graph 900 apply equally here.

Also shown in FIG. 9b is a mass spectrum plot 950 of a mass spectrum 132 generated in this experiment at the retention time 52.77. The mass spectrum plot 950 is as per the mass spectrum plot of FIG. 1b discussed above, and the discussions of the mass spectrum plot apply equally to the continuum plot 950 discussion apply equally here. In the continuum plot 950 the intensity is shown as relative abundance.

The continuum plot graph 900 shows five mass traces A0; A1; A2; A3; A4. Each mass trace comprises a set of intensity peaks. The mass traces A0; A1; A2; A3; A4 are shown on the graph as the sets of intensity peaks inside the respective dotted boundary lines for the corresponding mass trace A0; A1; A2; A3; A4. The mass traces A0; A1; A2; A3; A4 have been identified using the method described above with respect to FIGS. 3-5. The peaks marked A1 correspond to the intensity peaks plotted in the graph 1090 of FIG. 9a.

As can be seen each of the mass traces A0; A1; A2; A3; A4 correspond to respective ions from the same elution event. The retention time centre for the elution event is around 52.75 seconds. The mass trace A2 does not exhibit any deflection in the measured mass values. The other mass traces A0; A1; A3; A4 all show deflection of the measured mass values towards the measured mass values of the mass trace A2 In particular, it can be seen from the graph 900 that the deflection of the measured mass values increase with increasing intensity of the deflected intensity peaks.

Figure 9C:
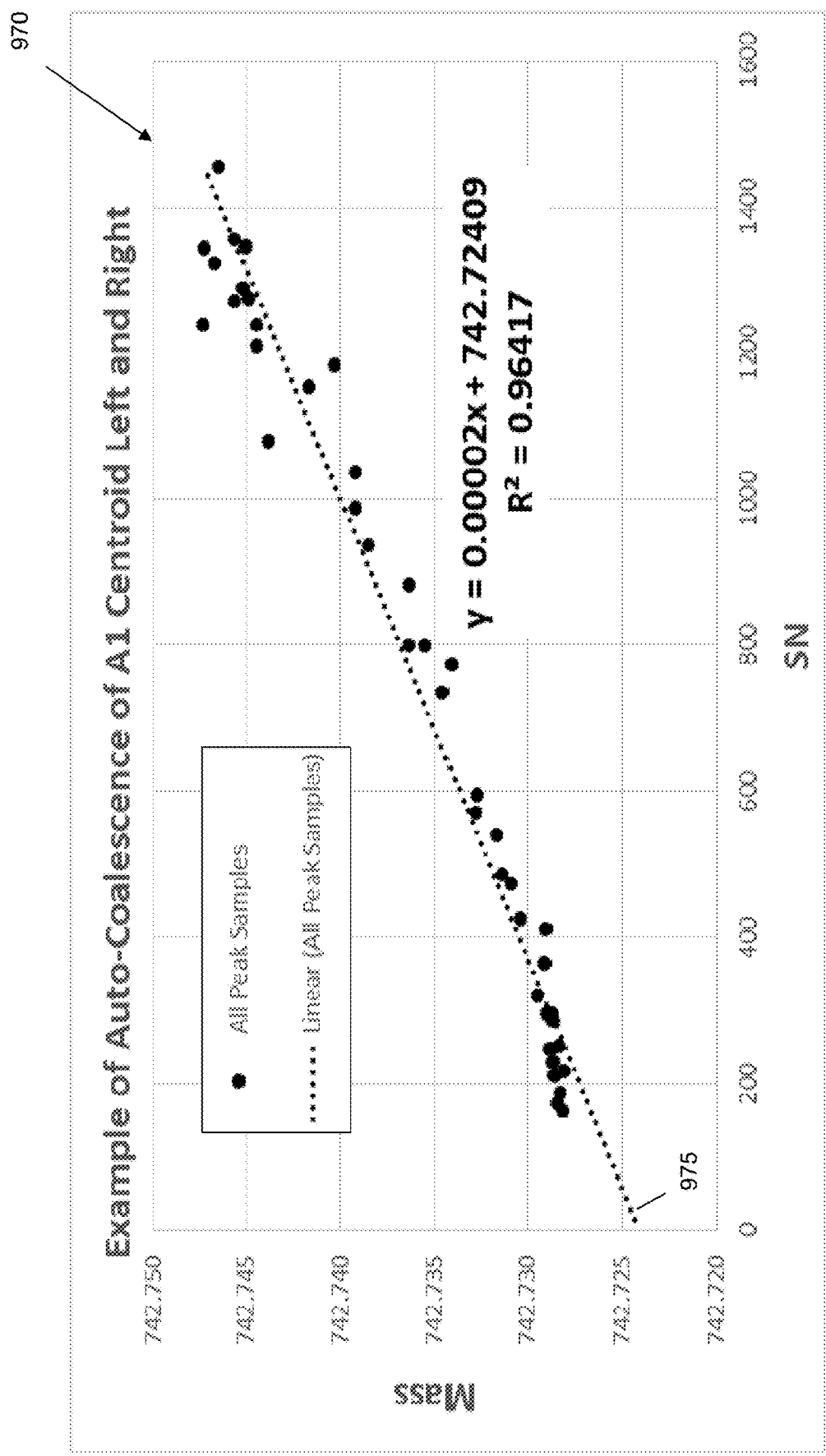
FIG. 9c shows an m/z value vs signal to noise plot of the intensity peaks from the mass trace A1 as shown in FIG. 9b as processed according using the method in FIG. 6b.

FIG. 9c shows an m/z value vs intensity plot 970 of the intensity peaks from the mass trace A1 shown in FIG. 9b.

Also shown in the plot 970 is a fitted regression function 975. The fitted regression function 975 has been generated using the method 600 described above with reference to FIG. 6*b*. In this example the regression function used comprises a first order polynomial. The fitted regression function 975 was obtained through use of a least squares fit algorithm, as set out above in relation to step 620 of method 600. The fitted regression function 975 is: $M(S) = -0.00002S + 742.72409$. In this case the signal zero that corresponds to zero ions is $S=0$. The corrected m/z value for the mass trace of A1 is therefore obtained as 742.72409.

In this way it can be seen that the m/z value of the most intense intensity peak of the mass trace A1 is deflected by around 0.022 mu—an error of 30 ppm—relative to the corrected m/z value obtained using the method of the invention. This is in excess of the 1-2 ppm error assumed in the prior art. As such it will be appreciated that the method 600 provides a significant correction to the m/z value reported for the mass trace A1.

Figure 9D:
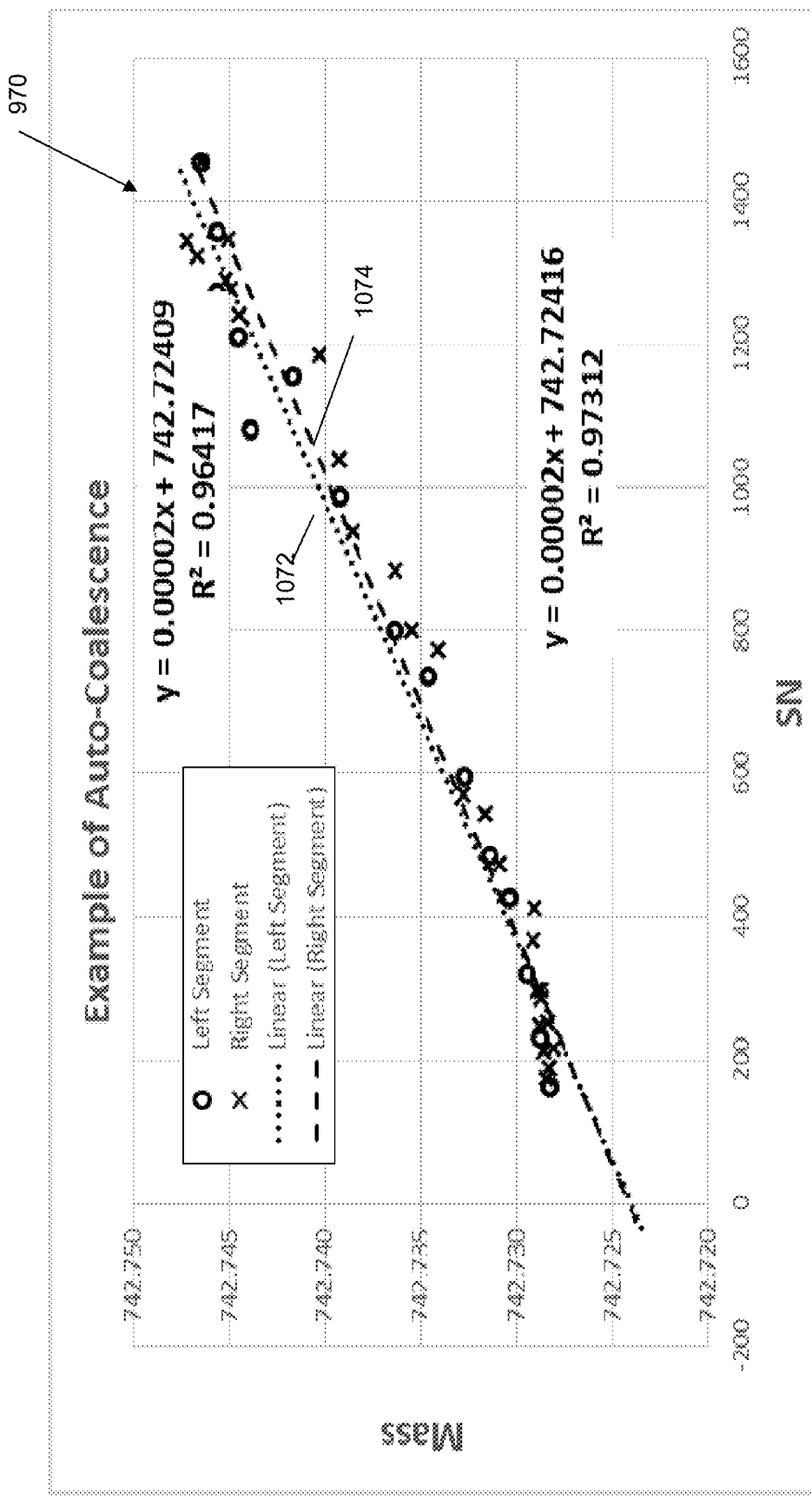
FIG. 9d shows an m/z value vs signal to noise plot of the intensity peaks of the experimental mass trace A1 shown in FIG. 9b as processed using the method in FIG. 7.

FIG. 9*d* shows the m/z value vs intensity plot 970 of the intensity peaks from the mass trace A1 shown in FIGS. 9*b* and 9*c*.

Here, the intensity peaks in FIG. 9*d* have been processed in line with the method discussed above with respect to FIG. 7. In particular, FIG. 9*d* shows that the intensity peaks have been partitioned into to a first subset (with the intensity peaks are indicated as dots) and a second subset (where the intensity peaks are indicated as crosses). In this example the first subset comprises intensity peaks corresponding to retention times between the start of the event and the retention time centre for the event. The second subset comprises intensity peaks corresponding to retention times between the retention time centre for the event and the end of the event.

Also shown in FIG. 9*d* are a first fitted regression function 1072 and a second fitted regression function 1074, fitted to the first and second subsets respectively. Both regression functions comprise first order polynomials. The first fitted regression function 1072 is given by $M(I) = 0.00002I + 742.72409$. The second fitted regression function is given by $M(I) = 0.00002I + 742.72416$. As can be seen the respective first and second estimates of the m/z values are 742.72409 and 742.72416 respectively. These agree to within 0.07 mu (or 0.095 ppm).

In the above description, mass spectra have been discussed in terms of m/z ratio and intensity and/or signal, in particular signal to noise. It will be appreciated however that mass spectra can be represented in a number of different ways, for example in terms of mass and relative abundance, mass and intensity, m/z ratio and relative abundance etc. The above discussions apply equally to any other way of representing mass spectra known in the art. Thus the skilled person would appreciate that discussions referring to the term m/z herein may be applied equally to the term mass and vice versa.

It will be appreciated that a separation device 110 as described above may comprise several different separation devices 110 chained together. For example the mass stream produced by a MALDI device may be then introduced to a chromatograph for further separation, with the resulting mass stream being provided to the mass spectrometer 130.

As set out above, event detection frequently makes use of model peaks. While this is described above based on an analytical model, such as a particular peak form (e.g. a Gaussian distribution), it will be appreciated that this model peak may as well be represented as a series of samples. This may especially be convenient, when a mass trace does not conform to a certain simple model but are "self-similar" except for scaling (and of cause shift). This may be especially convenient when model peak information is collected from the mass spectrometry data. The average peak shape may then be compared to a set of known models, from which one is chosen and parameterized if appropriate. When a systematic shape is found that doesn't conform to any of the models in the set, the observed average peak may be represented as a set of samples. The fitting methods and determination of quality factors (e.g. the variance of the measured points vs. the correctly scaled sampled model peak) are not significantly different. Linear or higher order interpolation of a sampled model peak may be necessary to adjust for variations in sample density.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of measuring a mass of an ion species in a mass stream, wherein the mass stream is a mass stream emitted from a separation device as a function of a separation parameter, the method comprising:
   obtaining, by a processor, a mass trace for the ion species, wherein the mass trace comprises a set of intensity peaks, each intensity peak providing a respective measured mass and a respective signal measured by a mass spectrometer; and
   determining, by a processor, in response to identifying deflection in the mass trace, the mass of the ion species as an extrapolation of the measured masses of the set of intensity peaks of the mass trace towards a signal zero.

2. The method of claim 1 wherein the step of determining comprises fitting a regression function to the intensity peaks, wherein the regression function relates measured mass to signal.

3. The method of claim 2 wherein the regression function is any of:
   a linear function; or
   a polynomial of N order, where N is an integer greater than 1.

4. The method of claim 2 wherein the regression function is fitted to the intensity peaks using any of:
   a least squares fit;
   a least absolute deviations algorithm; or
   a maximum likelihood type estimation.

5. The method of claim 1, further comprising:
   partitioning the set of intensity peaks into at least two subsets of intensity peaks;
   determining a first estimate of the mass of the ion species as an extrapolation of the measured masses of the first subset towards a signal zero;
   determining a second estimate of the mass of the ion species as an extrapolation of the measured masses of the second subset towards a signal zero; and
   accepting the determined mass of the ion species based on a comparison of the first estimate and the second estimate.

6. The method of claim 1, wherein the intensity peaks in the set correspond to a separation event having a start value for a separation parameter, an end value for the separation parameter, and a centre value for the separation parameter.

7. The method of claim 6, wherein a first subset comprises intensity peaks measured at a value of the separation parameter between the start value and the centre value, and a second subset comprises intensity peaks measured at a value of the separation parameter between the centre value and the end value.

8. The method of claim 1 wherein the step of obtaining comprises identifying the set of intensity peaks of the mass trace from a plurality of intensity peaks of the mass trace by applying an event detection algorithm.

9. The method of claim 1, wherein the separation device comprises a chromatograph and the separation parameter is retention time.

10. The method of claim 1, wherein the separation device comprises a mass spectrometry imaging device and the separation parameter represents a surface location of a sample provided to the mass spectrometry imaging device.

11. The method of claim 1, further comprising generating a corrected mass trace for the ion species based on the determined mass of the ion species.

12. The method of claim 1, wherein the step of obtaining a mass trace further comprises:
   receiving mass spectrometry data generated by analysis of the mass stream in a mass spectrometer, wherein the mass spectrometry data comprise a plurality of mass spectra each obtained for respective values of the separation parameter;
   identifying, from the plurality of mass spectra, a sequence of three or more intensity peaks that are ordered according to the separation parameter, wherein said identifying the sequence of three or more intensity peaks comprises:
      selecting an initial intensity peak at an initial measured mass, and
      for each other intensity peak of the sequence of intensity peaks,
      selecting said intensity peak based on at least the measured mass of an adjacent intensity peak in the sequence of intensity peaks.

13. The method according of claim 1, wherein the mass trace for the ion species is obtained by operating the mass spectrometer.

14. An apparatus for measuring a mass of an ion species in a mass stream, wherein the mass stream is a mass stream emitted from a separation device as a function of a separation parameter, comprising:
   one or more processors and memory configured to:
   obtain a mass trace for the ion species, wherein the mass trace comprises a set of intensity peaks, each intensity peak providing a respective measured mass and a respective signal measured by a mass spectrometer; and
   determine, in response to identifying deflection in the mass trace, the mass of the ion species as an extrapolation of the measured masses of the set of intensity peaks of the mass trace towards a signal zero.

15. A computer program product comprising one or more non-transitory computer-readable media having computer instructions stored therein, the computer program instructions being configured such that, when executed by one or more computing devices, the computer program instructions cause the one or more computing device to:
   obtain a mass trace for an ion species, wherein the mass trace comprises a set of intensity peaks, each intensity peak providing a respective measured mass and a respective signal measured by a mass spectrometer; and
   determine, in response to identifying deflection in the mass trace, the mass of the ion species as an extrapolation of the measured masses of the set of intensity peaks of the mass trace towards a signal zero.

* * * * *

UNITED STATES PATENT AND TRADEMARK OFFICE
CERTIFICATE OF CORRECTION

PATENT NO. : 11,217,436 B2
APPLICATION NO. : 16/692884
DATED : January 4, 2022
INVENTOR(S) : Pfaff It is certified that error appears in the above-identified patent and that said Letters Patent is hereby corrected as shown below:

In the Claims

In Column 34, Claim 13, Line 31, delete "method according of claim 1," and insert -- method of claim 1, --, therefor.

Signed and Sealed this
Twenty-eighth Day of June, 2022

Katherine Kelly Vidal
*Director of the United States Patent and Trademark Office*